United States Patent [19]
Norris et al.

[11] Patent Number: 5,512,971
[45] Date of Patent: Apr. 30, 1996

[54] METHOD OF AND APPARATUS FOR TRANSFERRING FILM

[75] Inventors: Philip R. Norris, North Reading; Frederick Slavitter, Needham; Kenneth G. Shown, Southbridge; Timothy J. Feehan, Dorchester, all of Mass.

[73] Assignee: Polaroid Corporation, Cambridge, Mass.

[21] Appl. No.: 302,603

[22] Filed: Sep. 8, 1994

[51] Int. Cl.⁶ .......................... G03D 17/00; G03D 13/08
[52] U.S. Cl. .............. 354/311; 354/83; 354/90; 354/333; 354/340
[58] Field of Search .................. 354/86, 88, 276, 354/283, 275, 308, 310, 311, 83

[56] References Cited

U.S. PATENT DOCUMENTS

| | | | |
|---|---|---|---|
| 1,648,525 | 11/1927 | Wittel . | |
| 3,249,029 | 5/1966 | Wareham | 354/75 |
| 3,443,500 | 5/1969 | Norton et al. | 354/180 |
| 3,447,436 | 6/1969 | Bartlett et al. | 354/83 X |
| 3,584,562 | 6/1971 | Wisner | 354/281 |
| 3,616,734 | 11/1971 | Inoue | 95/11 |
| 3,650,188 | 3/1972 | Whall | 354/86 |
| 3,940,774 | 2/1976 | Ivester | 354/83 |
| 4,236,798 | 12/1980 | Sylvester | 354/181 |
| 4,304,477 | 12/1981 | Green | 354/112 |
| 4,314,746 | 2/1982 | Koch | 354/276 |
| 4,348,086 | 9/1982 | Forscher | 354/83 |
| 4,804,989 | 2/1989 | Kumanomido | 354/283 |
| 4,814,801 | 3/1989 | Douglas | 354/86 |
| 4,833,493 | 5/1989 | Lamar | 354/107 |
| 4,903,063 | 2/1990 | Hara | 354/277 |
| 5,130,731 | 7/1992 | Larsen et al. | 354/276 |
| 5,292,612 | 3/1994 | Polizzotto et al. | 430/207 |
| 5,327,187 | 7/1994 | Slavitter | 354/275 |

*Primary Examiner*—D. Rutledge
*Attorney, Agent, or Firm*—Leslie Payne

[57] ABSTRACT

A film transfer apparatus and method are disclosed for use in transferring a film cassette containing an exposed film unit from an image recording apparatus and the film processor so that the film unit can be exposed in the image recording apparatus transferred in lighttight fashion to the processor, and automatically operated so that the film can be processed by the processor.

45 Claims, 22 Drawing Sheets

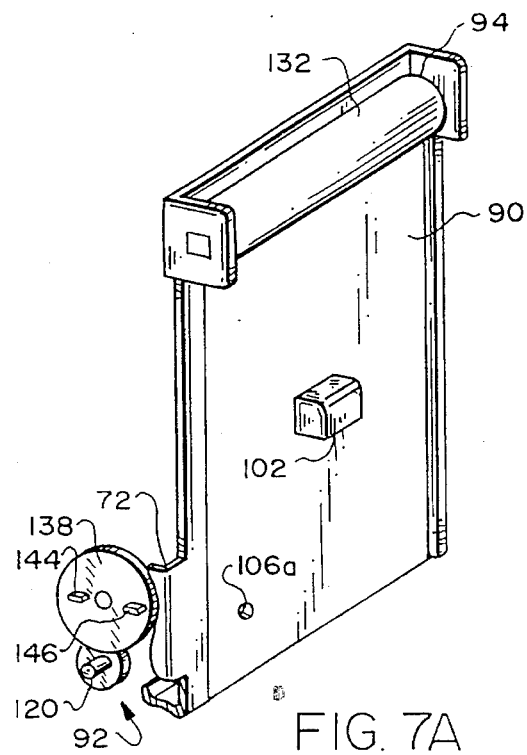
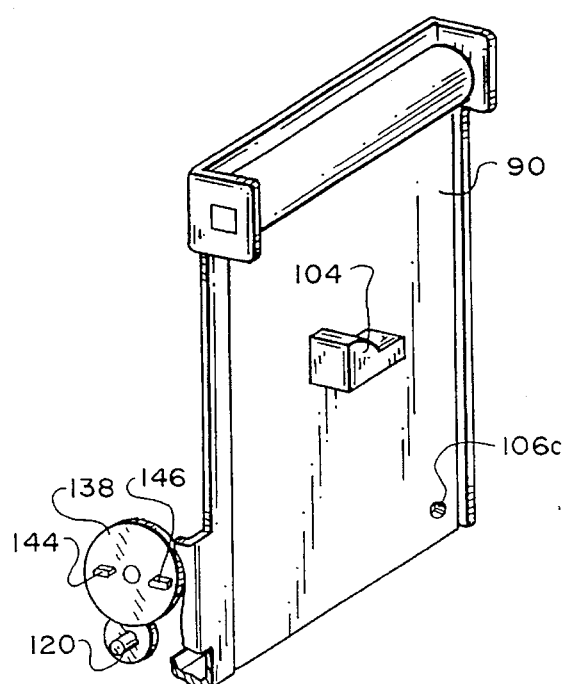
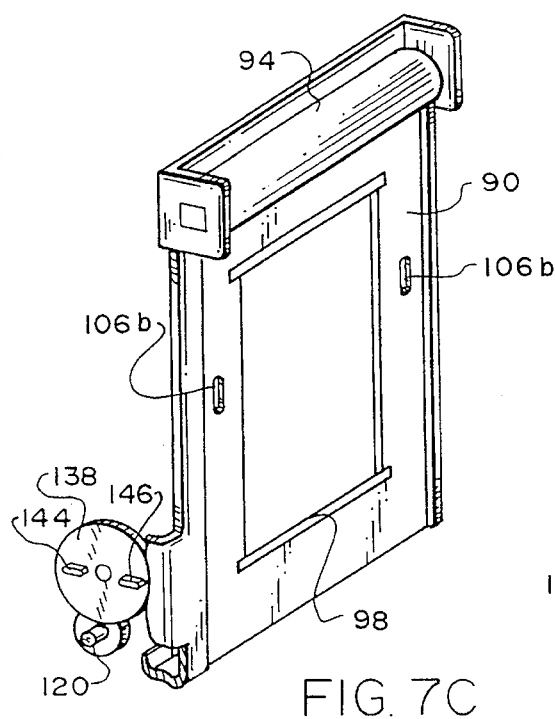
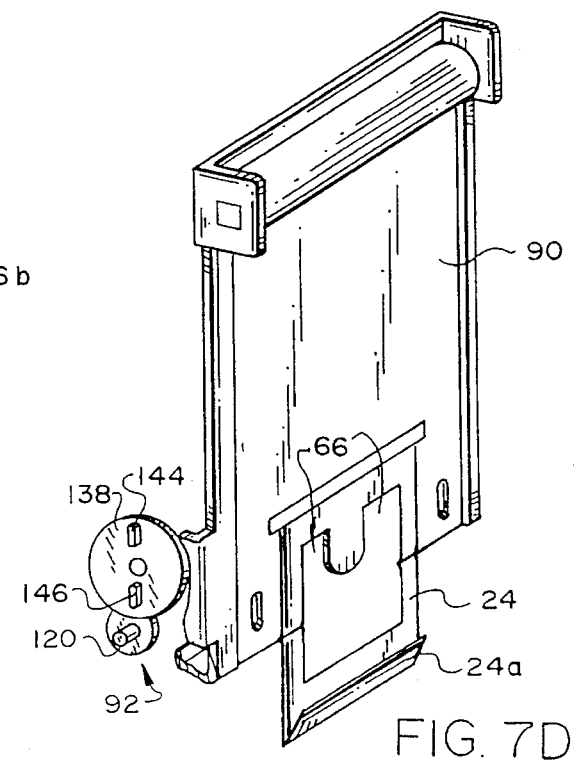

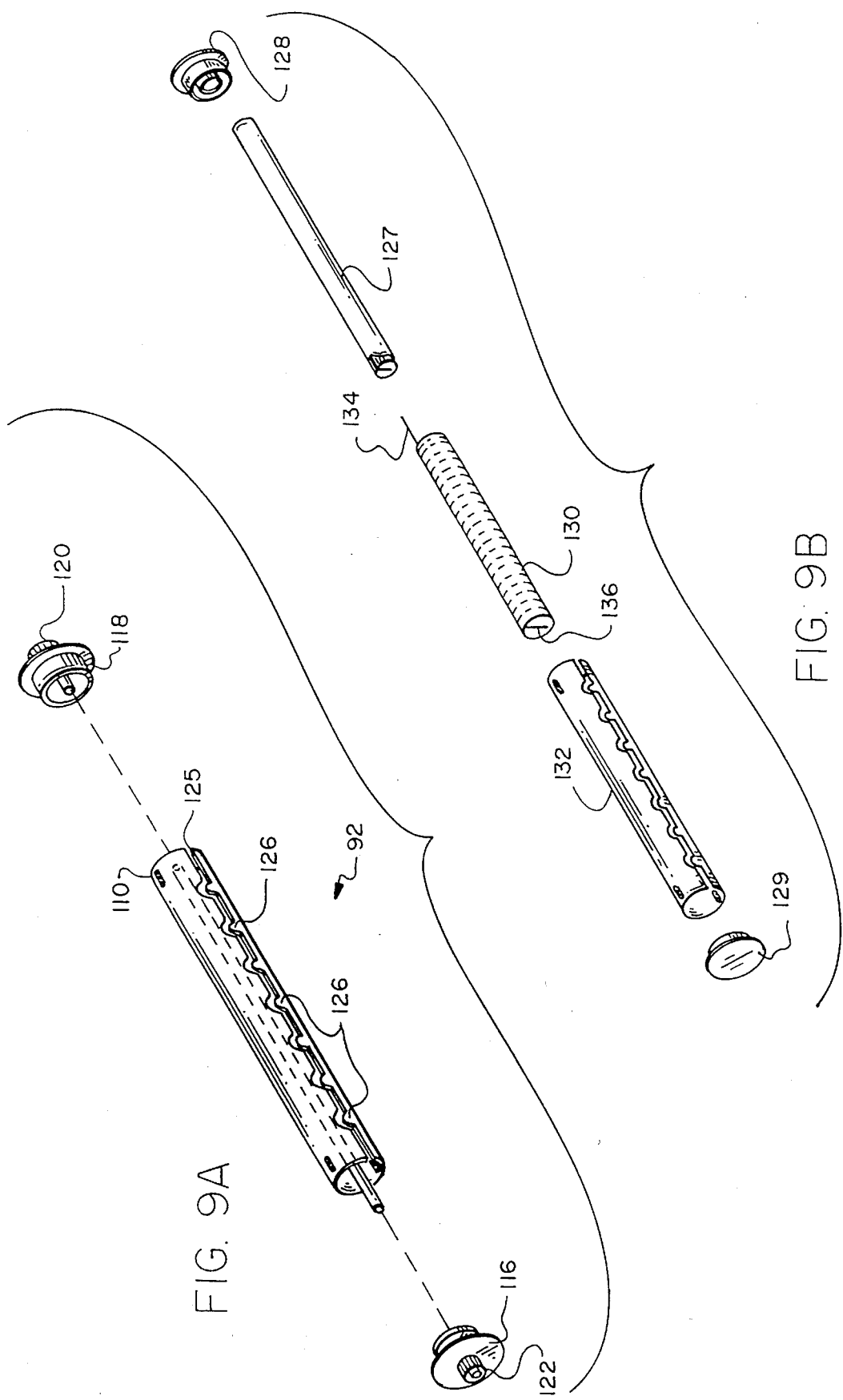

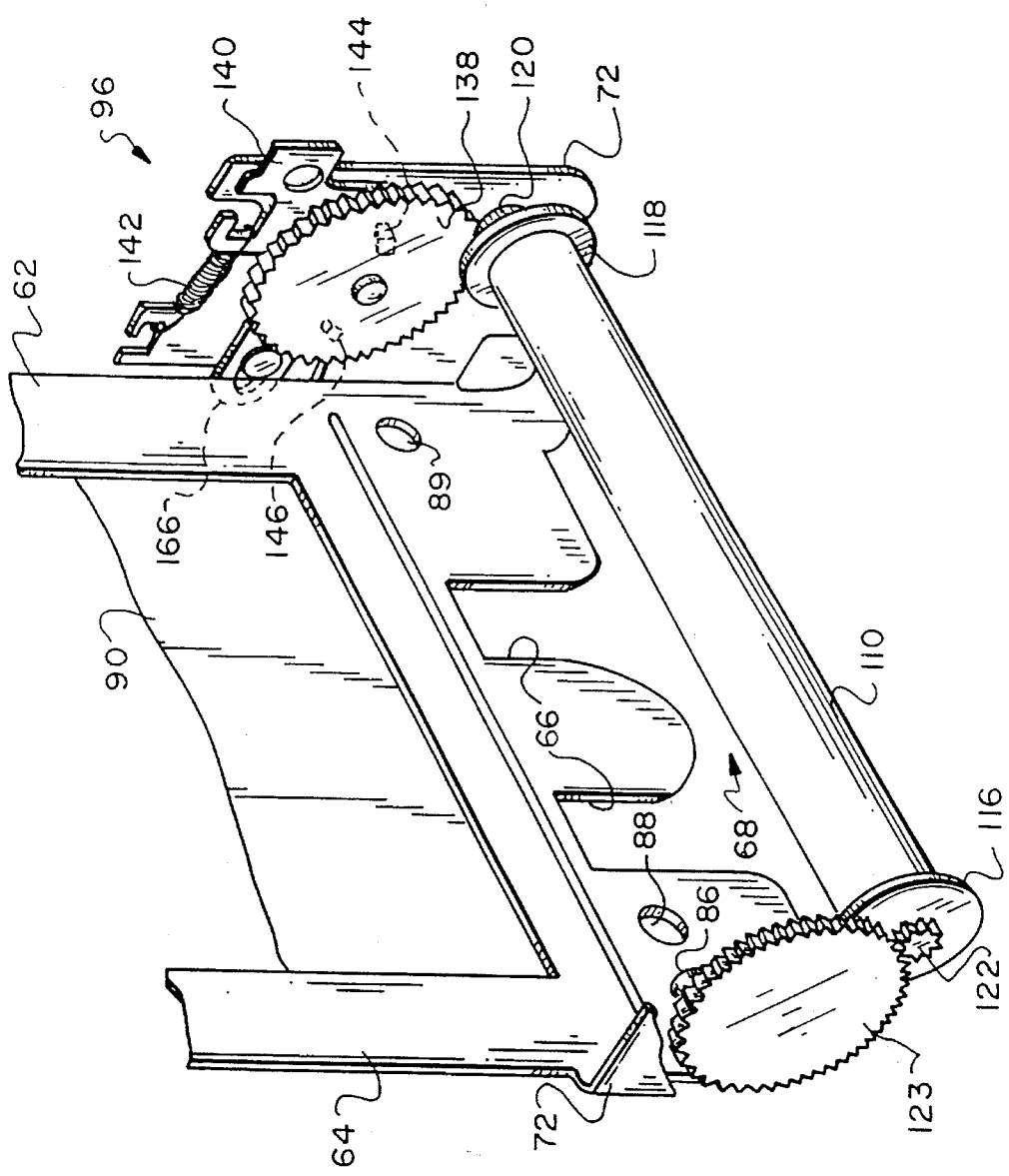

METHOD OF AND APPARATUS FOR TRANSFERRING FILM

CROSS-REFERENCE TO RELATED APPLICATIONS

The present application relates to the following copending United States patent applications; Ser. Nos.: 08/302,220, entitled "CAMERA BACK ADAPTER AND METHOD," filed concurrently herewith and, 08/312,420 entitled "CASSETTE FOR ENCLOSING A PLURALITY OF NEGATIVE FILM UNITS", filed on Sep. 24, 1994.

BACKGROUND OF THE INVENTION

The present invention relates generally to a method and apparatus for transferring photographic film in a lighttight manner between a photographic apparatus wherein the film is exposed and a film processing station whereat the film is to be processed. More specifically, it relates to apparatus and method which allow a film unit to be shuttled in a lighttight manner between a camera, wherein the unit can be automatically exposed, and a processing station, whereat, after every exposure, individual film units are ejected in order to initiate the film developing process in a film processor.

Heretofore, different approaches have been proposed for exposing film in a lighttight film holder and transferring the same from a camera to a processing station. One early approach used a lighttight container carrying a plurality of film units which were exposed one at a time. The container included an exposure opening and an associated dark slide between the opening and a topmost film unit for preventing against inadvertent exposure. The dark slide was manually removed from the container for allowing film exposure, and then reinserted manually for covering the film against exposure prior to the film container being removed from the camera.

Another known approach is described in U.S. Pat. No. 4,236,798, wherein a stack of individual film units of the self-developable type are contained in a cartridge and a dark slide is interposed between an exposure aperture of the cartridge and the topmost film unit of the stack. The dark slide is mechanically reciprocated to an external position relative to the cartridge, whereat the film unit is unblocked for exposure, and the slide is returned to its original position, but behind the forwardmost film unit of the stack.

Still another known approach is described in U.S. Pat. No. 5,130,731; wherein there is disclosed a manually portable film holder and a separate envelope or dark slide that allows a single photosensitive film unit to be handled in ambient light without being exposed as it is inserted into or withdrawn from the film holder. In particular, both the envelope and film unit are insertable into the holder and the envelope can be removed while the holder retains the film unit for exposure. Following film unit exposure, the envelope is reinserted into the holder to cover the exposed film unit and to facilitate film removal from the holder in a lighttight manner. Other known approaches for exposing a film unit in a lighttight film holder are described in U.S. Pat. Nos.: 4,804,989; 4,833,493; and, 4,903,063.

While the above approaches are satisfactory, they do not provide methods and apparatus wherein individual ones of, preferably, a plurality of film units carried in a film holder can be exposed automatically, one at a time, in a camera and then transferred in a lighttight manner to a processor for allowing sequential removal of exposed film units; whereupon the film holder can be returned to the camera for exposure of another film.

SUMMARY OF THE INVENTION

According to the present invention, there is provided shuttle apparatus for use in shuttling a photosensitive film unit, housed in a film container, in a lighttight manner between an image recording apparatus and a film processor. When the shuttle is in operative relationship within the image recording apparatus, the film unit can be exposed, and when the shuttle is transferred to the processor, the film unit is physically removed for processing.

In one illustrated embodiment, the apparatus for use in shuttling includes a portable lighttight housing assembly which removably receives the film container therein. The housing assembly includes an exposure aperture registerable with a container exposing opening when the container is received within the housing assembly for allowing exposure of a film unit by image bearing light presented at the exposing opening. The housing assembly is cooperable with an image recording apparatus in an exposing mode of operation, and with a film processing apparatus in a processing mode of operation. A blocking assembly is coupled to the housing assembly and is operable automatically for changing conditions between light blocking and unblocking conditions relative to the exposure aperture, wherein when in the unblocking condition image bearing light can expose the film unit. Also provided is a controlling means operatively connected to the blocking assembly and being actuatable when in operative relation with the image recording apparatus for changing conditions of the blocking assembly between the light blocking and unblocking conditions for allowing and preventing exposure of the film unit.

In another illustrated embodiment, the shuttle apparatus comprises a blocking assembly operable automatically to an unblocking condition relative to the container exposure aperture from a first light blocking condition when the shuttle is in an adapter associated with the image recording apparatus. The blocking assembly is appropriately actuated to a second blocking condition relative to the exposure aperture prior to shuttle removal from the adapter.

In another illustrated embodiment, the blocking assembly is also actuatable, when the shuttle is in the processor, to move to at least a partially unblocked condition which allows picking removal of the exposed film unit from the container and the shuttle.

In an illustrated embodiment, the control mechanism cooperates with a device in the processor for returning automatically the light blocking assembly to its first blocking condition from its second blocking condition.

In another illustrated embodiment, the light blocking assembly comprises a shutter assembly including a curtain having at least one shutter aperture. The curtain is movable between a supply roller assembly and a spring based takeup roller assembly mounted in the housing assembly. The shutter curtain is automatically movable within the shuttle, when the shutter assembly is actuated for selectively allowing image bearing light to expose the film unit through the aperture when coupled to the image recording apparatus. In this regard, the shutter aperture is positionable in light passing relationship, when the blocking assembly is in the light unblocking condition. The shutter aperture is not in light passing relationship to the aperture when the blocking assembly is in either the first and second light blocking conditions, such as when shuttle assembly is being transferred.

In another illustrated embodiment, provision is made for positively driving the shutter curtain from the second blocking condition to the first blocking condition by a recocking mechanism in the processor.

In another illustrated embodiment, provision is made for having the shutter curtain assembly drivable into an operative condition which allows the film unit to be picked from the film container.

In another illustrated embodiment, there is provided a film counter assembly in the shuttle which is operable for counting the number of film unit exposures.

In another illustrated embodiment, the shuttle includes provision for preventing the shutter assembly from being fired before being recocked.

In another illustrated embodiment, the shuttle cooperates with a sensor system in a processor for sensing the condition of a shuttle blocking aperture.

In another illustrated embodiment, there is provided another preferred shuttle embodiment which is positively and releasably locked by an adapter associated with the image recording apparatus.

In another illustrated embodiment, provision is made for a shielding arrangement in the shuttle assembly which is operable for preventing improper insertion of a negative cassette into the open shuttle.

In other embodiments there are provided a method and system for shuttling film housed in a film container between an image recording apparatus and a processor for processing the film, wherein the film is automatically exposed and removed from the shuttle.

Among the other objects and further scope of applicability of the present invention are the provision of an apparatus, system, and method which reliably shuttle, in a light tight manner film contained in a container from an image recording device to a processor which processes the film; the provisions of an apparatus, system, and method which allow a plurality of film units held in a stacked relation to be individually exposed automatically and then processed automatically after each exposure; the provisions of an apparatus, system, and method which allow for automatic withdrawal of each film unit from the container and shuttle in the processor; the provisions of an apparatus, system, and method which are simple and reliable in operation.

These and other objects and features and the invention itself will become apparent from the following description when taken in conjunction with the accompanying drawings wherein like structure throughout the several views are indicated by like reference numerals.

BRIEF DESCRIPTION OF THE DRAWINGS

FIGS. 7 A–D illustrate various operative conditions of the dark slide curtain of a blocking assembly of the shuttle;

FIG. 9A is an exploded perspective view of a supply roller assembly of the blocking assembly;

FIG. 9B is an exploded perspective view of a takeup roller assembly of the blocking assembly;

FIG. 10 is an enlarged and fragmented perspective view of certain components forming part of the shuttle;

DETAILED DESCRIPTION

Figure 1:
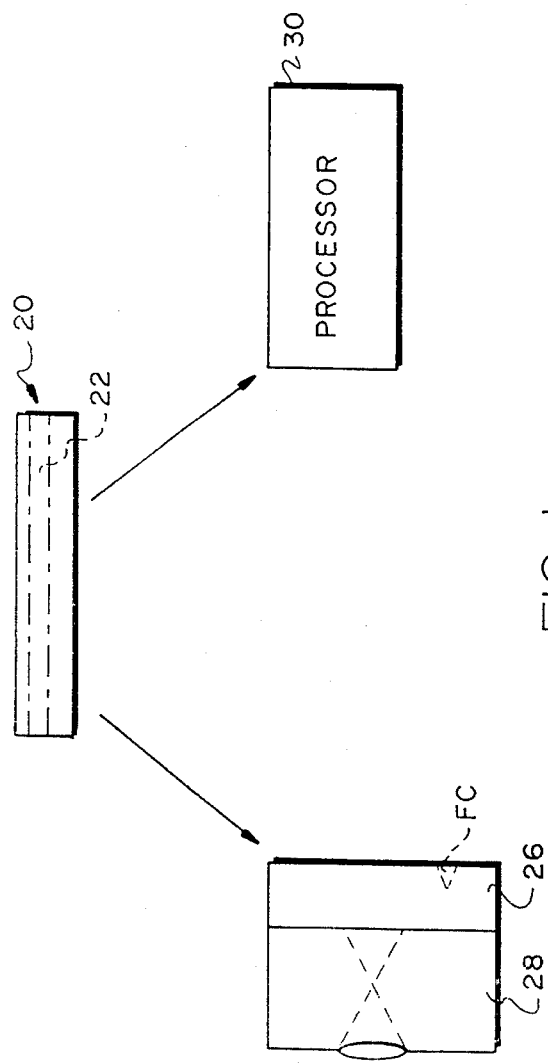
FIG. 1 is a schematic view of one preferred embodiment of the present invention using a shuttle in transferring a film cassette between a photographic apparatus and a film processor.

Reference is made to FIGS. 1–22 for illustrating one preferred embodiment of a portable, film transporting or shuttle assembly 20. The shuttle assembly 20 is constructed to conveniently and removably receive a negative film cassette 22 containing a stack of negative photographic film units 24 of the self-developing, peel-apart type. The negative cassette 22 is similar to that described in the aforenoted U.S. Patent Application More specifically, the shuttle assembly 20 serves to store and shuttle the film cassette 22 in a lighttight manner between a camera back adapter 26 and a separate film processor 30. The shuttle assembly 20 is also constructed to permit sequential film exposure, and to allow the processor to remove each unit, after each exposure, for processing of the same.

In this embodiment, the negative film cassette 22 is similar to that described in the aforenoted patent application entitled "CASSETTE FOR ENCLOSING A PLURALITY OF NEGATIVE FILMUNITS", and the film unit 24 is a negative sheet assembly like that described in commonly assigned U.S. Pat. Nos. 5,292,612; and 5,327,187. The negative assembly includes a pocket device (not shown) which is adapted to receive a force transmitting device or pick which will enable the film unit to be advanced from the cassette. The negative film assembly cooperates with a positive sheet assembly (not shown) which positive sheet assembly has an image-receiving layer thereon. The descriptions of both of these patents and the last noted application are incorporated herein by reference. It will be appreciated that this invention envisions that other kinds of photosensitive film units, preferably of the self-developing type, can be used. The camera back adapter 26 is like that described and claimed in commonly-assigned and copending U.S. patent application Ser. No. 08/302,220 entitled "CAMERA BACK ADAPTER AND METHOD," filed herewith. The camera 28 is a miniportrait camera of the self-developing type which exposes a negative film unit of a peel-apart film assemblage. The camera 28 is commercially available from Polaroid Corporation, Cambridge, Mass., USA. Both the adapter and the camera operate as image recording apparatus. While the present embodiment discloses a photographic camera, it will be appreciated that the present invention can be used with an electronic display screen for providing the images. The processing generally performed by the processor 30 is similar to that described in the aforenoted U.S. Pat. Nos. 5,292,617; 5,327,187; wherein the negative sheet assembly is joined to a positive sheet assembly (not shown) in an automatic peel-apart film processor for initiating film processing, whereby the positive and negative are subsequently peeled apart, and the positive sheet reveals a fully developed positive image. Neither the film cassette 22, film unit 24, camera back adapter 26, camera 28, nor the processor 30, per se, form aspects of the presently claimed invention. However, only those details thereof which are necessary for understanding this invention will be described.

As illustrated in FIGS. 2 & 4–6, the shuttle assembly 20 comprises a portable and clamshell-like housing assembly 32 that is operable between an open or negative cassette insertion and removal condition; and a closed, lighttight or cassette carrying condition. In this regard, the shuttle housing assembly 32 includes a front cover 34 that is hingedly connected by pivot pins (not shown) to a back cover 36 for movement thereof between the noted open and closed conditions.

The portable housing assembly 32 is constructed for facilitating convenient user handling and transporting. In this regard, the front and back covers 34, 36 are each made of a one-piece molded plastic construction, which when in the closed condition are constructed to have a lighttight relationship with each other for assisting in protecting the topmost negative film unit housed in the cassette 22. The front cover 34 includes a front panel 38 having a pair of laterally spaced apart sidewalls 40 and integral therewith upstanding top and bottom walls 42, 44; respectively. A generally rectangular exposure aperture 46 in the front panel 38, is dimensioned to permit desired exposure of an image receiving area 48 (FIG. 5) on a negative film unit 24. The image area 48 is juxtaposed an exposure opening 50 of the negative cassette 22 so that it can be in registry with the shuttle's exposure aperture 46 when the cassette is properly located.

The front panel 38 is formed with a pair of laterally spaced apart pick slots 52, each of which has a generally rectangular configuration and extends axially. Contiguous with the terminal portion of the pick slots 52 is a transversely extending exit slot 54 which allows each film unit to be ejected therethrough in response to a force transmitting or picking action by processor pick 56 (FIG. 6) of the processor 30. The pick 56 is reciprocated along a generally vertical path by a pick drive mechanism motor 57 (FIG. 3) located in the processor 30. The pick when operated is driven to selectively drive the film unit 24 downwardly through the slot 54 after it has emerged from a corresponding film egress (not shown) in the cassette 22. In this regard, the pick 56 passes through the pick slots 52 and corresponding pick slots 59 (FIG. 5) in the cassette, as it travels downwardly to engage a pocket 24b on the film unit. Such picking continues until the negative has emerged from both the container and the shuttle housing, whereby the negative and the positive sheet assemblies are joined together; in a manner similar to that described in the last-noted patents. As will be described subsequently, for the film to be ejected, the shuttle blocking means must be operated to accomodate such withdrawal. After completion of the picking as sensed by sensors, the motor 57 is operated to drive the pick 56 upwardly to its start position for another picking operation. Such picking does not, per se, form an aspect of the present invention.

Continued reference is made to FIGS. 2 & 4–6, wherein the top portion of the housing assembly is shown to be laterally offset with respect to a plane containing the front panel 38 for facilitating easy grasping and transporting of the housing by an operator. The front cover 34 has a locking bail 58 pivotally attached thereto for cooperating with surfaces on the back cover 36 to thereby secure the covers together in their closed orientation.

Figure 2:
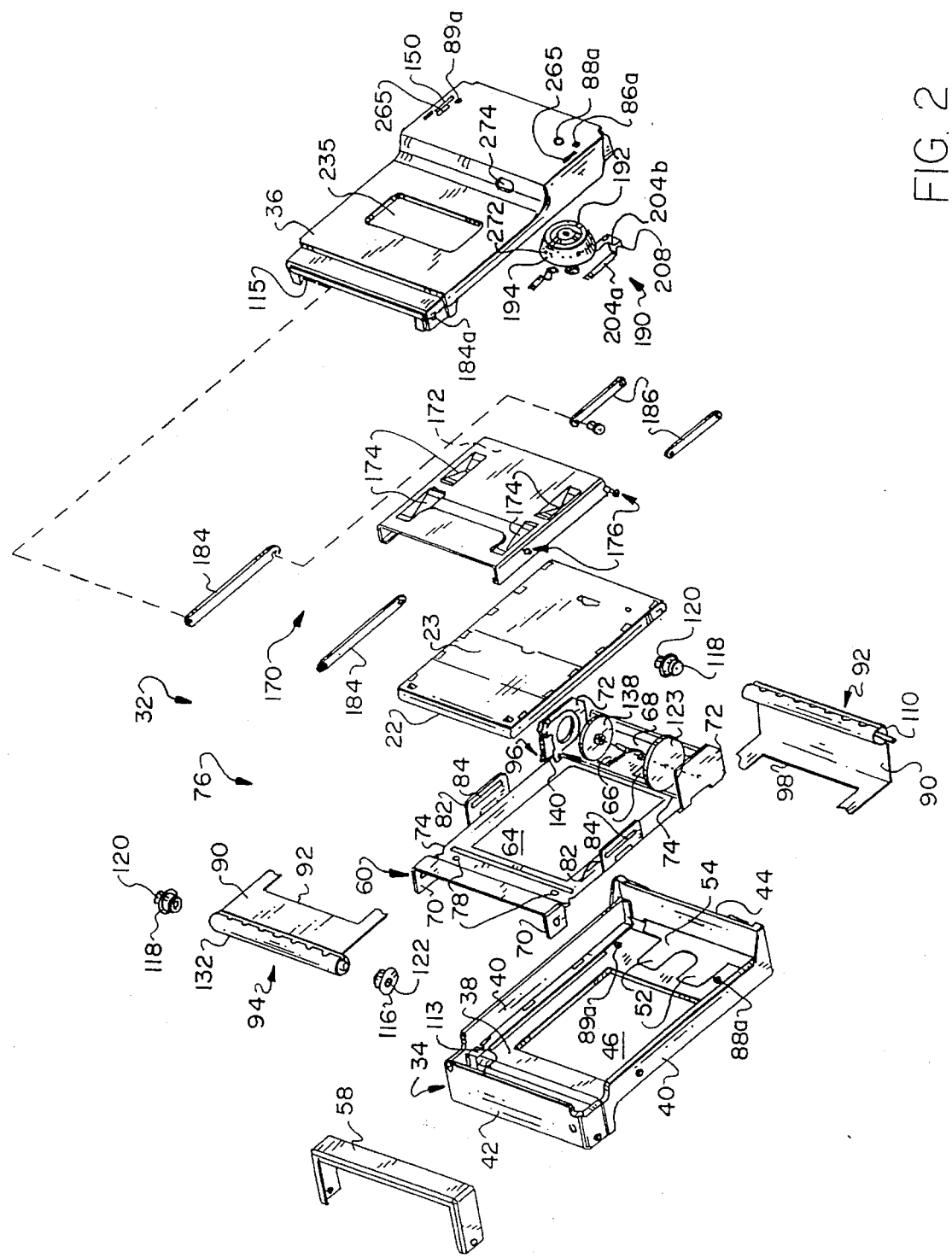
FIG. 2 is an exploded perspective view of one embodiment of the shuttle.
Figure 3:
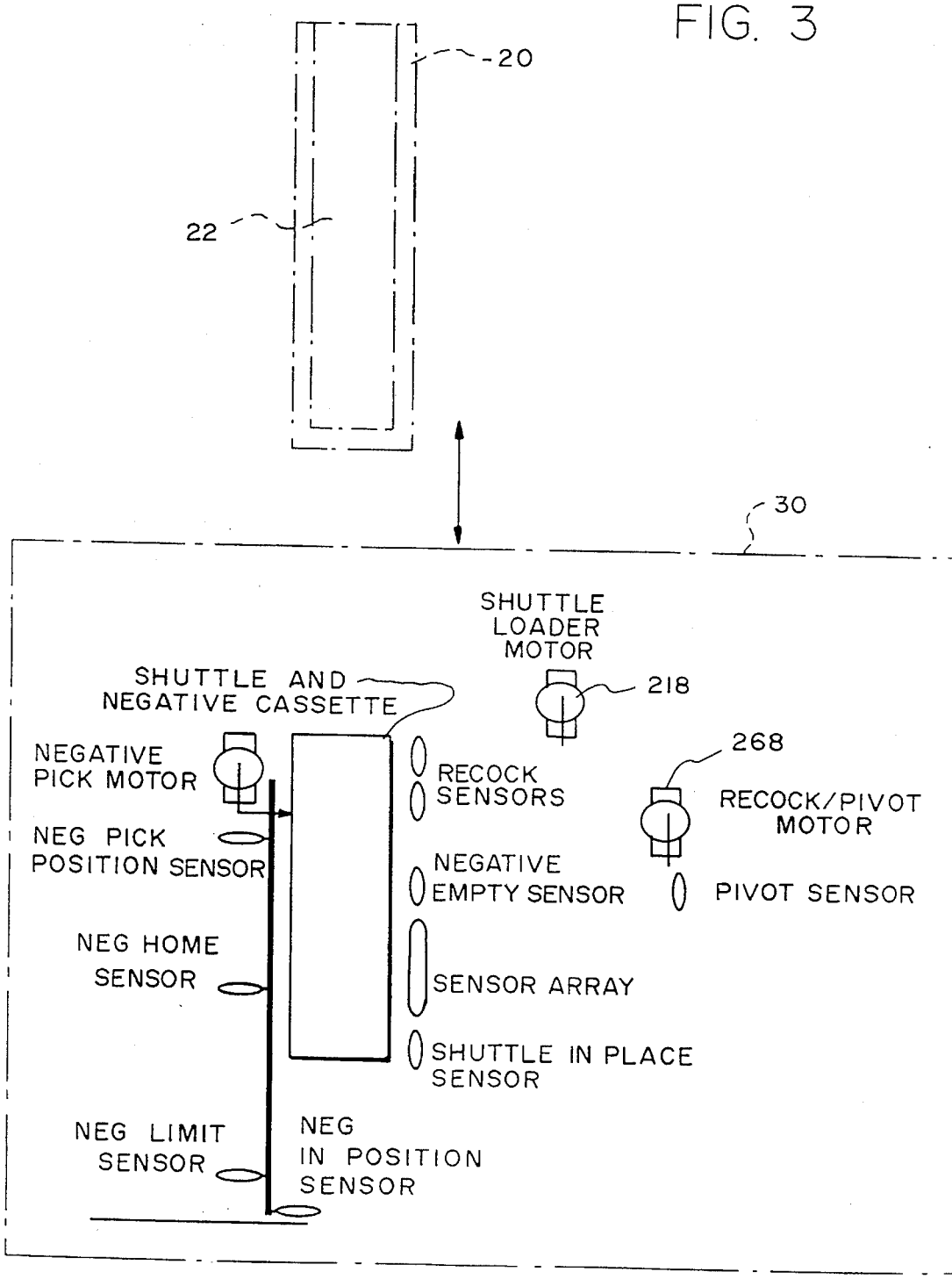
FIG. 3 is a schematic view of the shuttle in operative relationship with certain operating components of the processor.
Figure 4:
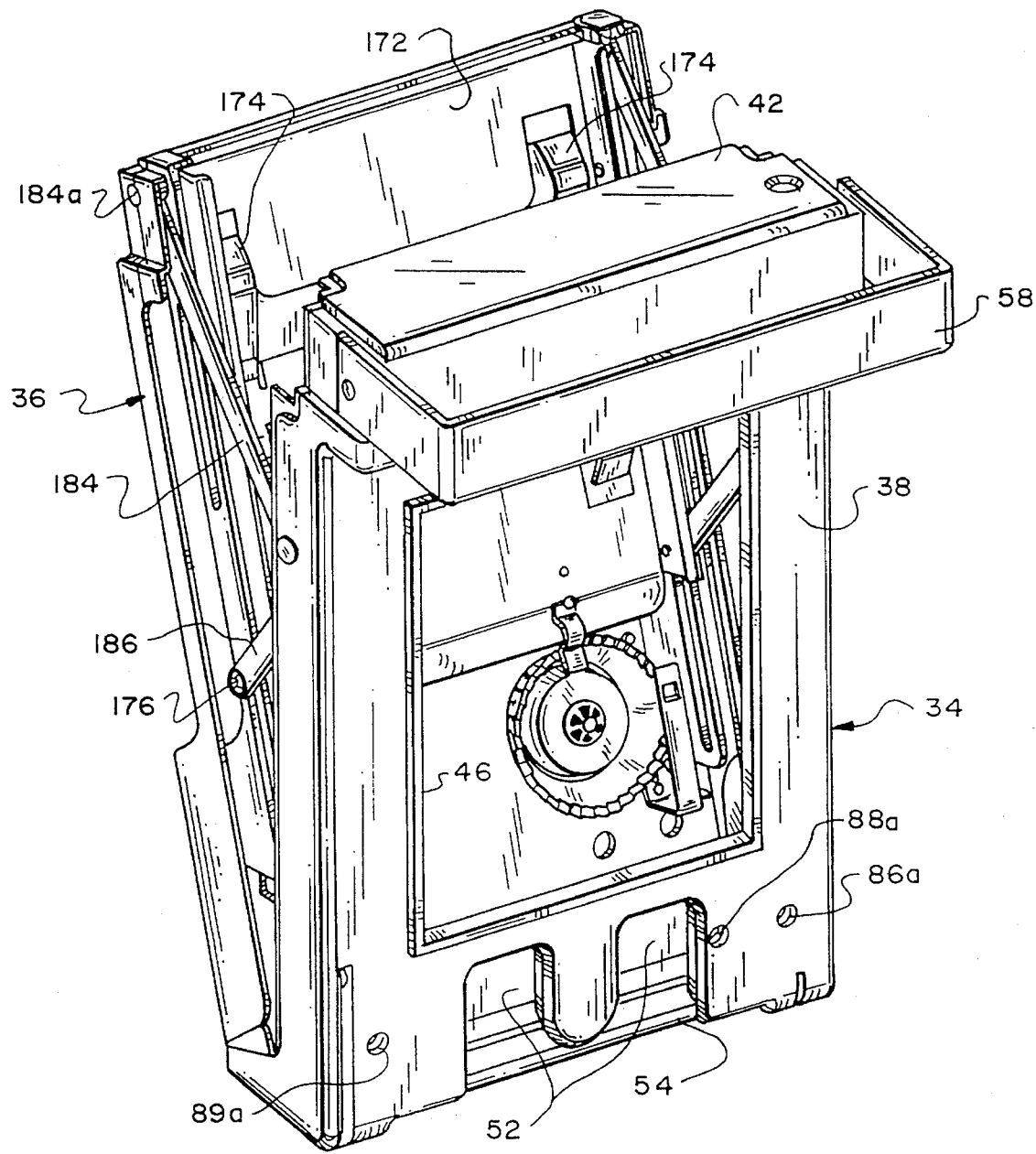
FIG. 4 is a perspective view of the shuttle in an open condition but without a negative film cassette contained therein.
Figure 5:
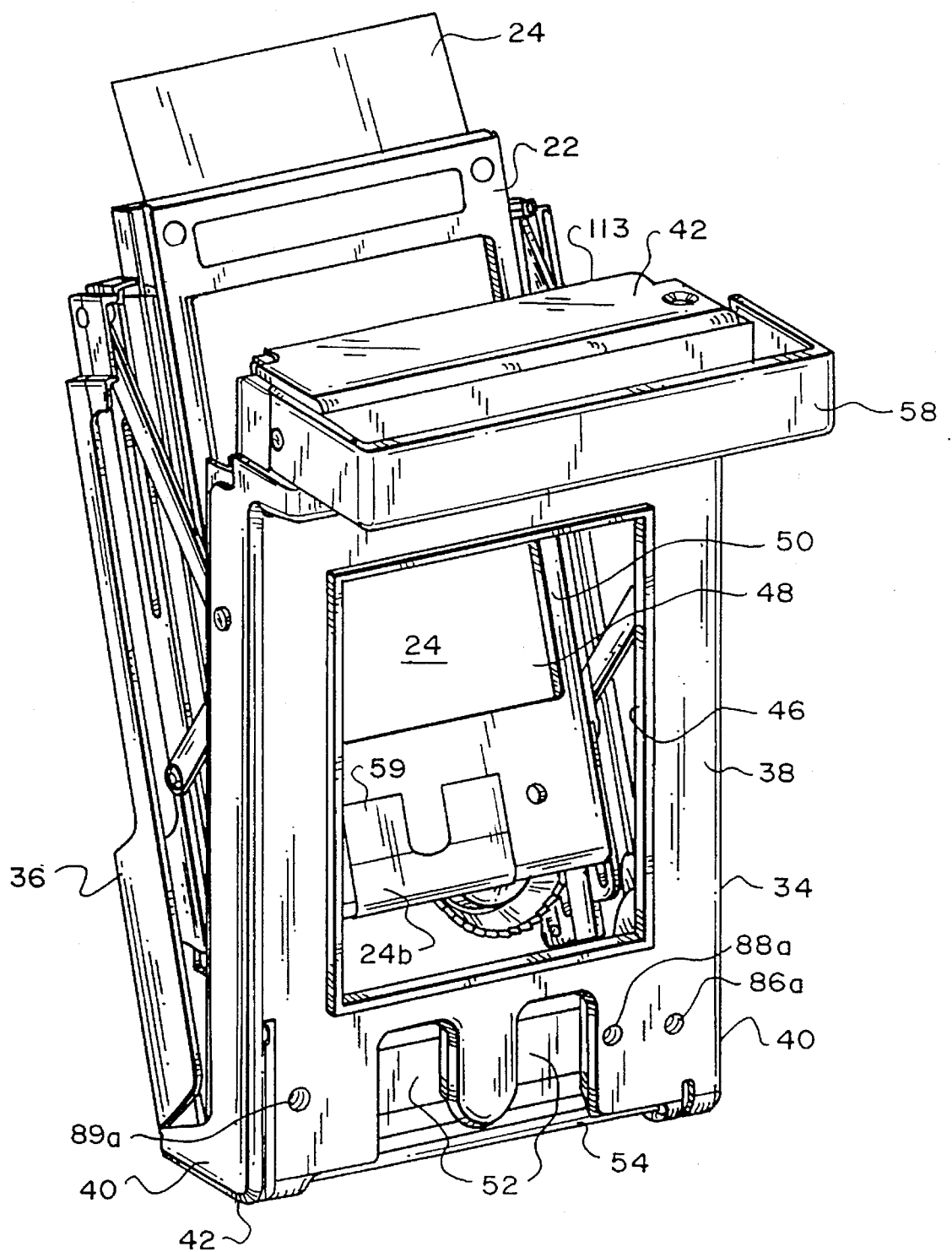
FIG. 5 is a perspective view similar to FIG. 4 but showing the open shuttle with a film cassette being inserted therein.
Figure 6:
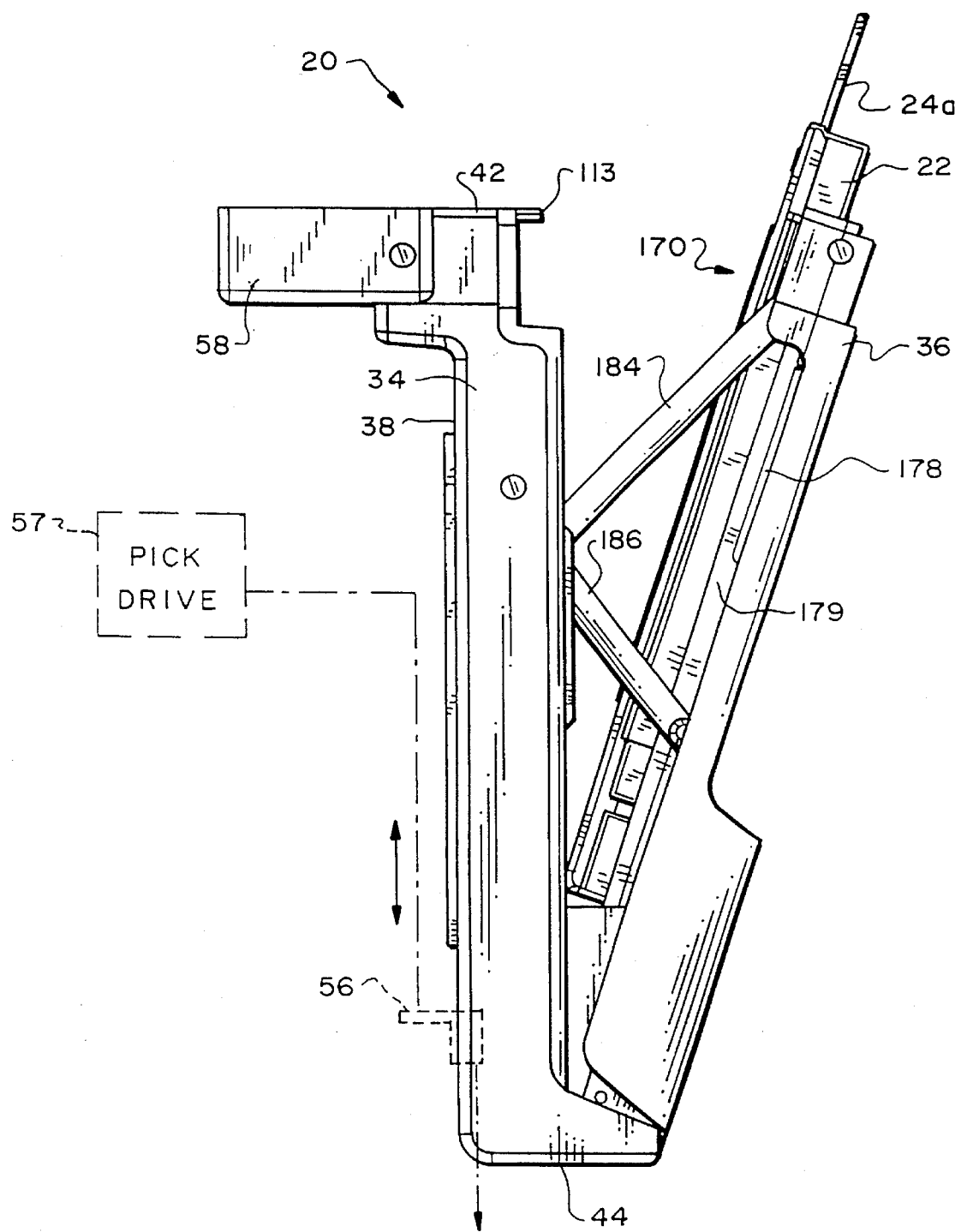
FIG. 6 is a side view of the shuttle of FIG. 5.

Reference is made back to FIG. 2 wherein there is illustrated a generally rectilinear main frame member 60. The frame member is attached at its opposite longitudinal ends to the front cover 34. The frame 60 includes a rectangular central body 62 with an exposure aperture 64 formed therein. The exposure aperture 64 is adapted to be in registry with the exposure aperture 46 as well as the exposure opening 50 when the cassette is properly inserted in the shuttle. The central body 62 includes in its bottom portion a pair of spaced apart and parallel pick slots 66, each of which is in registration with a corresponding one of the pick slots 52 and with slots (not shown) of the cassette. This registration allows for the processing picks to pick the film unit pocket and advance each successive exposed topmost film unit from the cassette 22 and the shuttle assembly 20. In this regard, a transversely extending film unit exit slot 68 is beneath and contiguous with the pick slots 66 and sized for allowing a picked film unit to pass therethrough and the slot 54 formed in the housing assembly. Formed on the central body 62 are pairs of parallel and spaced apart upper and lower retainer plates 70, 72; respectively, which extend laterally in the opposite direction from each other. A pair of spaced apart and transversely oriented protrusions 74 are formed integrally on the central body 62. One protrusion 74 is above the aperture 64 while the other is below for slidably cooperating with an automatic blocking or dark slide assembly 76 for enhancing the lighttight features provided by the blocking assembly. The body 62 provides a pair of datum openings 78 for allowing datum surfaces (not shown) on the front cover 34 to protrude therethrough for contacting the cassette 22 and properly locating the latter. Also, the body 62 has a pair of track members 82, each on a lateral edge thereof and extending in the same direction away from the aperture 64. Each of the track members 82 includes an axially extending slot 84 for cooperation with a linkage assembly as will be described. A group of photodetector openings 86, 88 and 89 (FIG. 10) are provided in the main frame assembly and are operable, in a manner to be described, for indicating the operational condition of the blocking assembly. In this embodiment, the openings are adapted to be in alignment with corresponding openings 86a, 88a, 89a formed in the front and back covers. In addition, the cassette is formed with an opening (not shown) which cooperates with one of the noted photodetector openings as will be described. These photodetector openings allow photodetector beams (not shown) of suitable photodetector devices (not shown) within the processor to be transmitted therethrough in order to selectively cooperate with the blocking means for indicating the operational condition of the latter in a manner to be described as well as to indicate whether the cassette is out of negative film.

Reference is now made to FIGS. 2 & 7 A–D for illustrating several operational conditions of the automatic blocking or dark slide assembly 76. The blocking assembly 76 is mounted on the main frame assembly 60 intermediate a topmost film unit (not shown)and the cover's exposure aperture 46. Basically, the blocking assembly 76 is operable to sequentially block, unblock, and reblock apertures corresponding with the image receiving area of the film unit in order to control exposure of the latter. The blocking assembly is also actuatable in the processor 30 to a move to at least a partially unblocked position (FIG. 7D) for allowing a pick of the processor to not only pick the film pocket but to eject the film unit through the noted film exit slots.

The blocking assembly 76 is also actuatable in the processor in a manner to be described so as to facilitate a return or recocking thereof to its original or first blocking condition. In this manner, the blocking assembly is ready for refiring thereof. The blocking assembly 76 basically includes a dark slide curtain 90; supply and takeup roller assemblies 92, 94; respectively, attached to opposite longitudinal ends of the curtain; and an escapement mechanism 96 which permits rapid and precise indexing of the blocking assembly.

Figure 8:
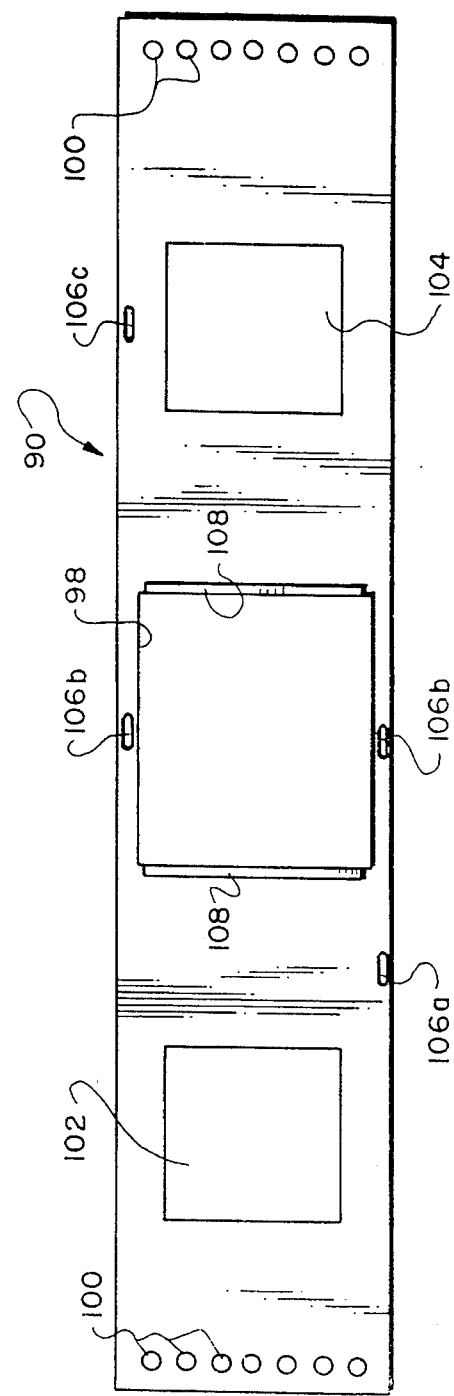
FIG. 8 is a plan view of a dark slide curtain shown in FIGS. 7 A–D.

Reference is made now to FIGS. 7 A–D & 8 for illustrating the dark slide curtain 90. In this embodiment, it is made of a thin, opaque, flexible, and lightweight material which possesses a low-coefficient of friction and is durable. Also, the curtain material should, preferably, be chemically non-reactive with the film units. In a preferred embodiment, the curtain 90 is made a polymeric material, such as TEDLAR™, which is commercially available from E.I. Dupont de Nemours and Company, Wilmington, Delaware, USA. Other similar materials, can, of course, be utilized. As seen in FIG. 8, the curtain 90 has a generally rectangular configuration and is provided with a central exposure aperture 98 and a plurality of aligned attachment openings 100 at each longitudinal end which secures the curtain to the respective supply and takeup rolls. The width of the dark slide curtain 90 is wider than the film unit being exposed, the exposure opening and the frame's exit slot so as to assist in maintaining a lighttight condition of the topmost unit in the cassette. The aperture 98 is sized and shaped for allowing exposure of the film unit present at the cassette aperture 50 when the curtain is in its open or unblocking condition (FIG. 7C). The exposure aperture 98 can also be moved to a partially open condition such as shown in FIG. 7D for allowing picking of a film unit 24 when the shuttle is in the processor 30 and it is desired to eject or pick the exposed film unit.

With continued reference to FIGS. 7A–D & 8, it is noted that the dark slide curtain 90 has indicia 102 and 104 on opposite sides of the aperture 98. In this regard, the indicia 102 can be observed through the aperture openings 46, 50, 64 when the curtain 90 is in a preexposure or camera ready condition, while the indicia 104 can be observed following exposure, indicating that the blocking assembly has been fully fired and the exposed film can be processed. Accordingly, an operator will be able to immediately determine the condition of the film unit in the shuttle assembly 20 so as to avoid improper handling. The marginal edges of the curtain 90 are provided with encoding apertures 106a, 106b, and 106c. The encoding apertures selectively cooperate with sensing beams (not shown) and the photodetector openings to indicate to the processor the various operative conditions of the curtain 90 and its exposure aperture. For instance, the aperture 106a is alignable with the openings 86, 86a in the frame and the covers for allowing a photodetector beam to travel therethrough for indicating to the processor that the curtain is in the fully recocked position (FIG. 7A). The apertures 106b are simultaneously alignable with openings 86, 86a; 89, 89a for indicating that the aperture 98 is in its partially opened picking mode, see FIG. 7D. The aperture 106c is alignable with the openings 89, 89a for indicating that the curtain has fired, see FIG. 7B. The opening 88a is alignable with the opening in the frame 89 and a corresponding cassette opening (not shown) for indicating the fact that the negative cassette is out of film. As viewed in FIG. 8, a pair of stiffeners 108 are attached to the dark slide curtain 90 at opposite ends adjacent the aperture 98 for preventing possible tearing of the curtain as the latter moves relative to the main frame assembly 60.

Reference is made to FIGS. 2, 5, 6 & 22 for illustrating a film safety guide arrangement 109 formed by the shuttle housing assembly 32. In this regard, there is provided a slot 111 formed by and between the front and back cover surfaces 113, 115 through which a film safety cover 24a of the film unit 22 extends. In this regard, the surfaces 113, 115 are formed so that the film safety guide 24a attached integrally to the film unit 24 is deflected, whereby it clears the bail during the latter's movement. It will be appreciated that the film safety cover 24a is manually pulled by an operator from an exit slot in the cassette and the slot 111 to thereby unblock the image area of a film unit and make it exposure ready.

FIG. 9A illustrates the supply roller assembly 92 as including a thin sheet metal tube or supply roll 110, a rotatable shaft 112 coaxially disposed within the tube and fixed for rotation to corresponding end caps 116, 118. The end caps 116, 118 are connected to the shaft 112 and each is snap fit, about their periphery, to the corresponding open ends of the supply roll 110. The end caps 116, 118 have formed thereon integral axial pinions 120, 122; respectively. The shaft 112 extends to and between the lower pair of retainer plates 72 and allows the supply roll 110 and pinions 120, 122 to rotate. As seen in FIGS. 2 and 10, a stop gear 123 is rotatably connected to one of the lower retainer plates and meshes (FIG. 10) with the pinion 122. As a result, the stop gear 123 rotates with the supply roller assembly 92. Referring back to the supply roll 110, it has mutually opposing and spaced apart longitudinal edges 125 with interleaving portions 126 which have a scalloped configuration as shown and which cooperate with the openings 100 for uniformly distributing the pulling forces on the curtain and thus avoiding tearing of the latter. In the normal or first blocking condition of the blocking assembly, the supply roller 110 has thereon several wraps of the dark slide curtain.

Reference is made to FIG. 9B for illustrating a preferred embodiment of the takeup roller assembly 94 which includes a takeup shaft 127 having rotatably attached at opposite ends thereof a pair of end caps 128, 129. The shaft 127 is affixed between the upper retainer plates 70 and is coaxially disposed within a biasing coil spring 130, and a hollow takeup roll 132. The coil spring 130 includes a tang 134 connected to one end cap 128, and another tang 136 connected to the fixed shaft 127 itself. The end caps 128, 129 are rotatable on the shaft 127 and are snap fit within each end of the takeup roll 132 so as to rotate as a unit about the shaft 127. The takeup roll 132 is similarly configured as the supply roll 110 so as to cooperate with the openings 100 on the curtain.

For preloading the takeup roller assembly 94, the takeup roll 132 is rotated by a preloading process and this serves to torsion the coil spring 130 about the fixed shaft 127. Accordingly, the takeup roller assembly 94 is biased in one direction of rotation (counterclockwise as viewed in FIG. 2). When the takeup roller assembly is free to rotate, such preloading has a tendency to drive or wrap the curtain 90 from the supply roller assembly 92 onto the takeup roll 132. In this embodiment, the coil spring 130 includes a wound segment of wire and has an appropriate number of turns provide the desired preloading force for to pulling the curtain 90 at the right speed. The preload force for driving the curtain is resisted by the escapement mechanism 96 which provides forces necessary for stopping rotation of the supply and takeup roller assemblies and thus, controlling the advancement or payout of the curtain 90.

Reference is now made to FIGS. 2, 7 A–D, 10 & 11 for illustrating one preferred embodiment of an escapement mechanism 96 for use in controlling the advancement of the blocking assembly. As depicted, it is mounted to one of the lower retainer plates 72 opposite the stop gear 123 and operatively cooperates with the supply roller assembly 92 for indexing the curtain 90 in a manner to be described. The escapement mechanism 96 essentially includes a meter gear 138, a spring-biased escapement plate 140, and an escapement biasing spring 142.

The meter gear 138 is rotatably mounted on the retainer plate 72, and its teeth meshingly engage the pinion gear 120. Consequently, as the supply roll assembly rotates the meter gear 138 rotates. The meter gear 138 includes a pair of first and second stop protrusions 144, 146 (FIGS. 7 A–D ) which are formed on its inner surface facing the escapement plate 140 and they are spaced apart from each other by 180 degrees. The stops 144, 146, as will be explained, control the rotational indexing movement of the gear in one direction of rotation into 180° rotational segments. In this regard, the stops 144, 146 cooperate alternatively with an internal stop shoulder 148 formed integrally on the escapement plate. The back cover is formed with an opening 150 (FIG. 2) which permits a recocking mechanism to engage the meter gear and rotate the same in the opposite direction. Such a reversal drives the blocking assembly back to the first blocking condition from the second blocking condition; whereby the shuttle is ready for another exposure.

Figure 11:
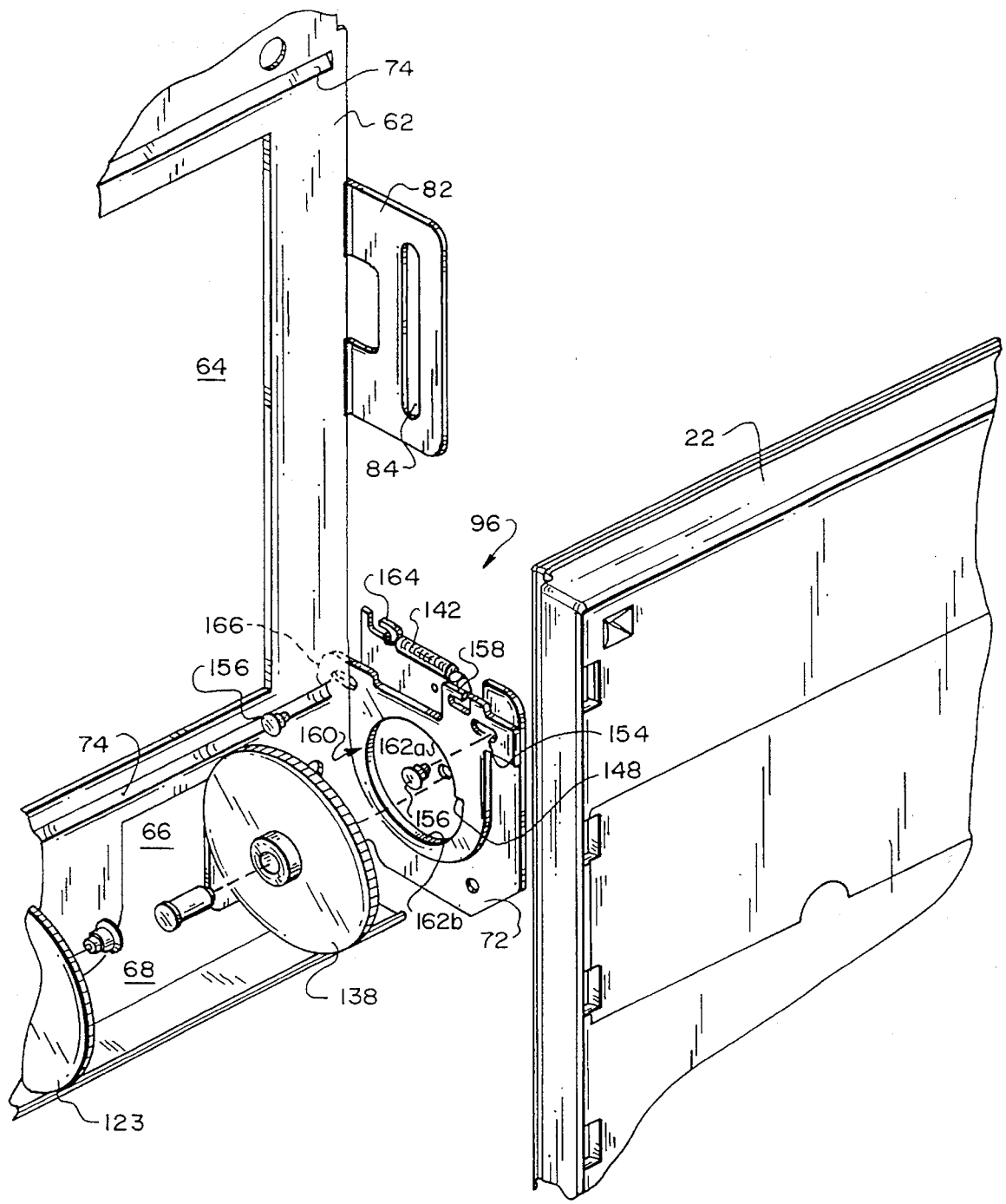
FIG. 11 is an enlarged, fragmented, and partially exploded perspective view of an escapement mechanism of the blocking assembly.

As viewed in FIG. 11, the escapement plate 140 is a stamped one-piece body which includes a pair of spaced elongated slots 154 for sliding reciprocation relative to corresponding retaining rivets 156 on the retainer plate which secure the escapement plate for sliding movement between locking and unlocking positions. Also, included is a hook portion 158, and a central opening 160 defined by two offset hemispherical portions 162a, 162b which define the radial stop shoulder 148. A radial projection 163 extends towards the center of the opening 160 and is sized and positioned so as to slow the spread of the meter gear 138, such that either one of the stops will more reliably engage the radial stop shoulder 148. One end of the escapement spring 142 is fastened to the hook 158 and the other end is fastened to a hook 164, whereby the plate 140 is biased toward the body portion 60 and its locking position. As a result, the stop shoulder 148 is biased to a position for engaging one of the stops 144, 146 for thereby preventing rotation of the meter gear 138 and, hence the supply roller assembly.

A rounded cam engaging protrusion 166 is formed on the escapement plate and is aligned with an opening 168 in the back cover so as to be activated by an adapter firing cam FC which is located in the camera adapter, such as described in the noted copending application entitled "CAMERA BACK ADAPTER AND METHOD". It will be understood that when the cam protrusion 166 is displaced inwardly by the adapter's firing cam, such as when the shuttle is inserted into or removed from the adapter, the biasing force of the spring 142 is overcome. Hence, the stop shoulder 148 is displaced rightwardly, as viewed in FIG. 11. This frees the supply roller assembly for rotation by reason of the stored energy of the takeup roll assembly. Accordingly, the curtain unwinds from the supply roller assembly and the extent of the curtain payout is limited by the escapement mechanism 96. Specifically, during the curtain payout the pinions 120, 122 rotate and hence, the meter gear 138 and the stop gear 123 rotate; respectively. Rotation of the meter gear continues until its stop 146 travels about 180° and engages the stop shoulder 148. This stopping action occurs because the stop shoulder 148, under the influence of the spring 142, returns to its original stopping or locking position, such as after the cam 166 no longer engages the adapter's firing cam FC during continued insertion movement of the shuttle into the adapter. The curtain 90 is thus indexed from its first blocking condition to the unblocking condition, whereby the aperture 98 is displaced so that it is precisely in registration with the aligned exposure apertures.

Following exposure by the camera, an operator can remove the shuttle from the adapter. In the process of so doing, the cam protrusion 166 is reengaged by the adapter's firing cam FC during movement of the shuttle out of the adapter. This withdrawal has the effect of again advancing the cam 166 and escapement plate inwardly against the biasing of the spring 142 because the cam reengages the firing cam, whereby the stop shoulder 148 moves out of engagement with the stop 146. Thus, the meter gear 138 is free to rotate with the supply roller assembly under the influence of the stored energy of the takeup roller. Such rotation continues until the stop 144 rotates 180 degrees; whereupon it reengages the stop shoulder 148. In this regard, the stop shoulder 148 moves back to its locking position, whereby it is engaged by the stop, after the cam 166 clears the adapter's firing cam. As a result of the foregoing, the curtain 90 has been indexed from the noted unblocking condition (FIG. 7C) to its second blocking or fully fired condition (FIG. 7B). In this latter condition, the exposure aperture 98 is out of alignment with the noted cassette and shuttle apertures for terminating or preventing exposure.

Thus, the blocking assembly is controlled by the escapement mechanism 96, whereby the former is indexed automatically from its first blocking condition to its unblocking condition and next to its second blocking condition for completion of the exposure cycle.

Figure 12:
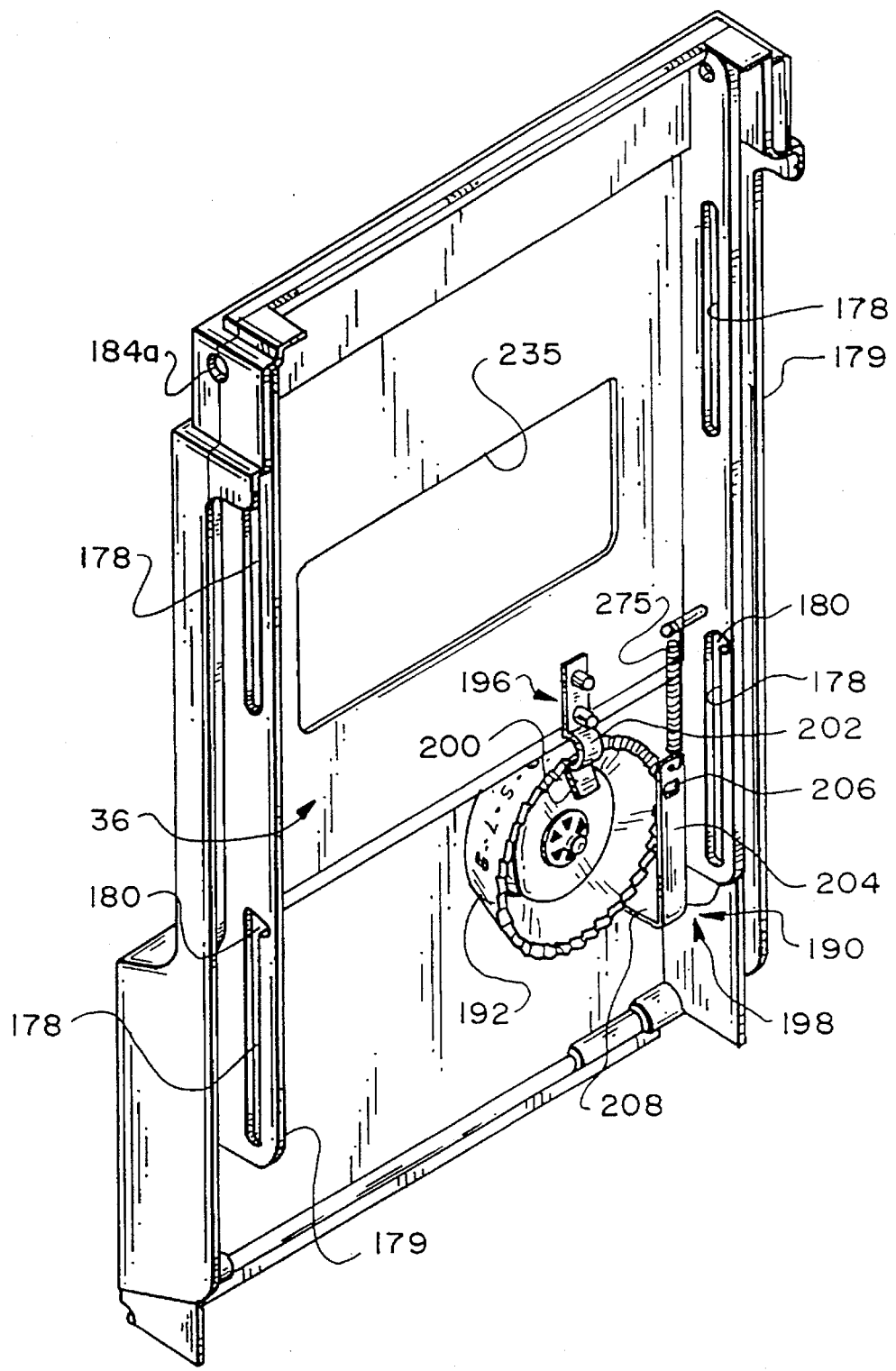
FIG. 12 is a perspective view of the shuttle housing back cover and operative components of a film exposure counter of the present embodiment.
Figure 13:
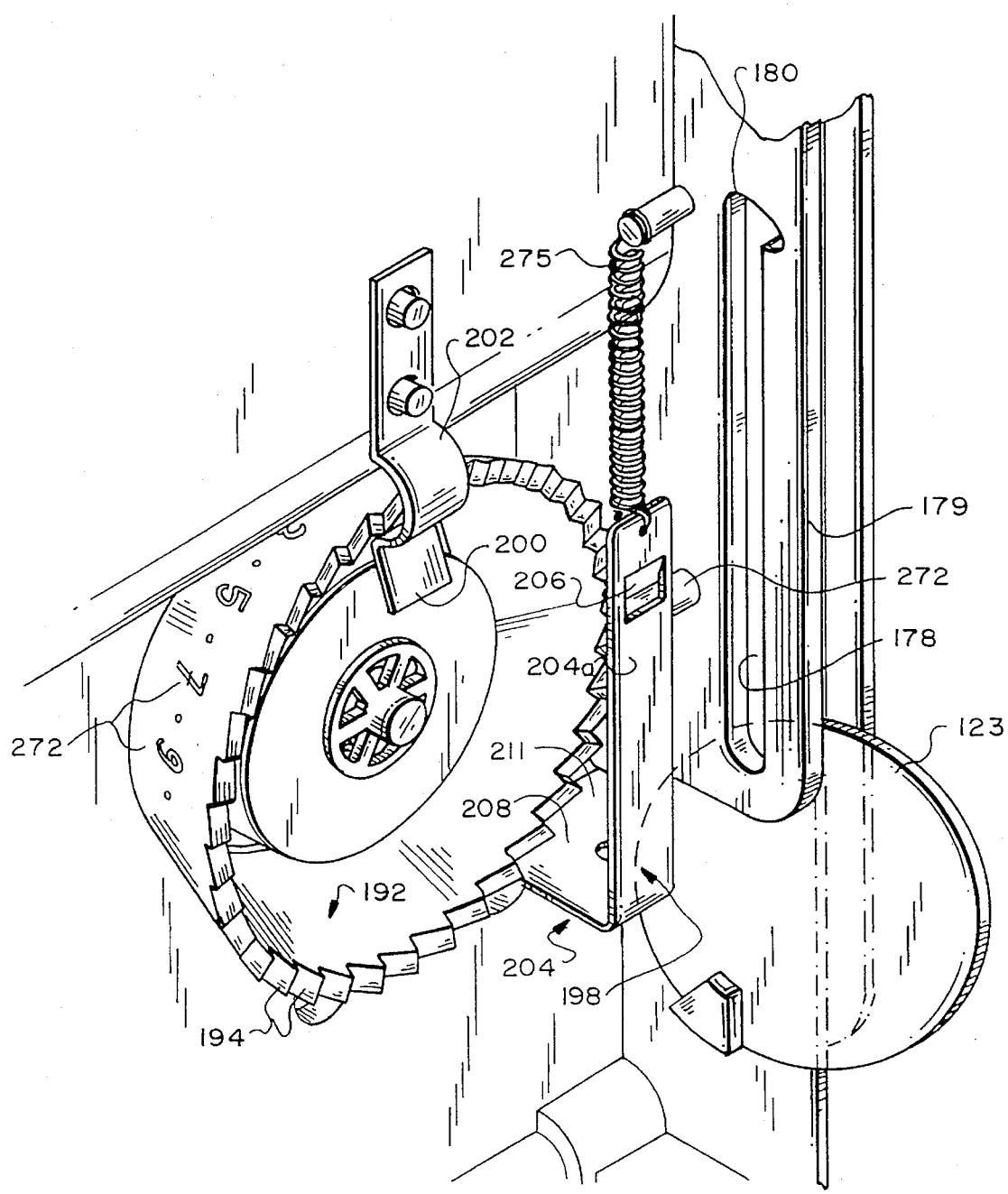
FIG. 13 is an enlarged, fragmented, and exploded view of the film exposure counter of FIG. 12.
Figure 14:
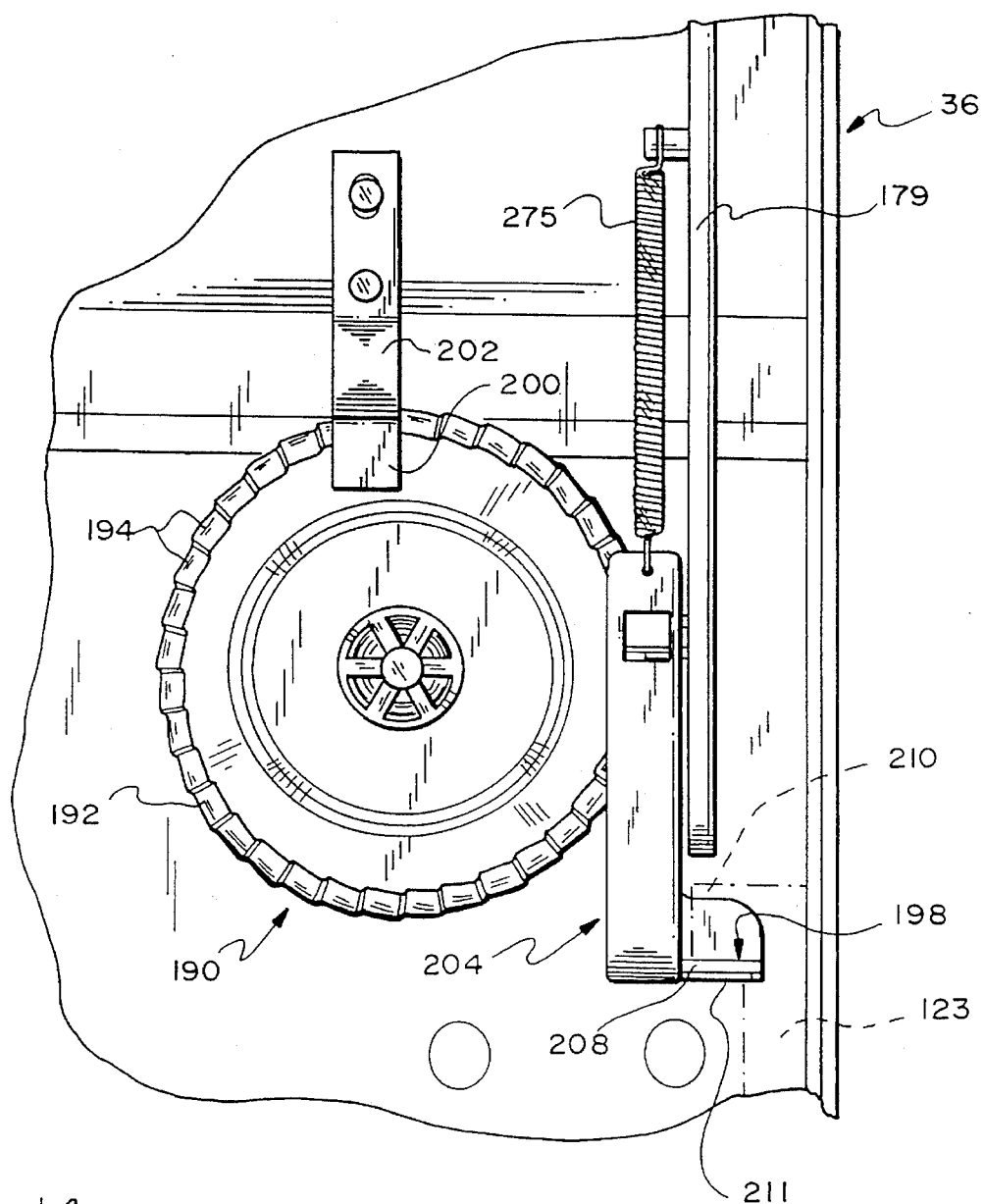
FIG. 14 is an enlarged and fragmented view of the counter of FIGS. 12 and 13.
Figure 15:
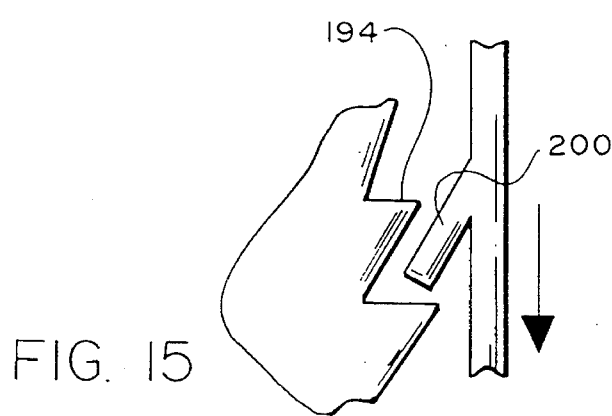
FIG. 15 is an enlarged and fragmented view of the advancing pawl member in the process of engaging a ratchet tooth of a counter wheel.
Figure 16A:
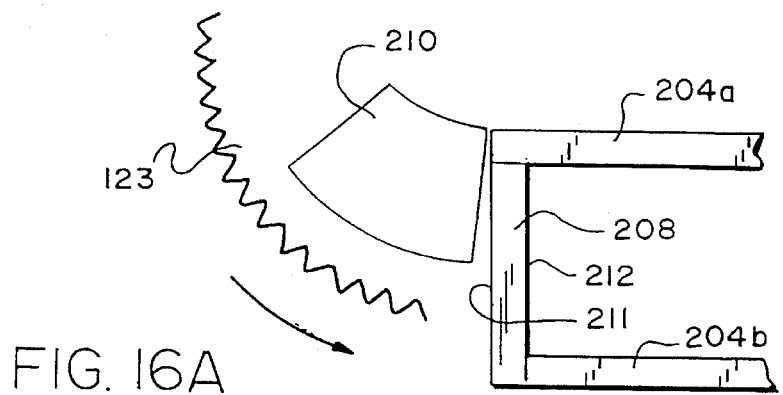
FIGS. 16 A–D illustrate in schematic views the sequence of operational steps of the stop gear and the advancing pawl.
Figure 16B:
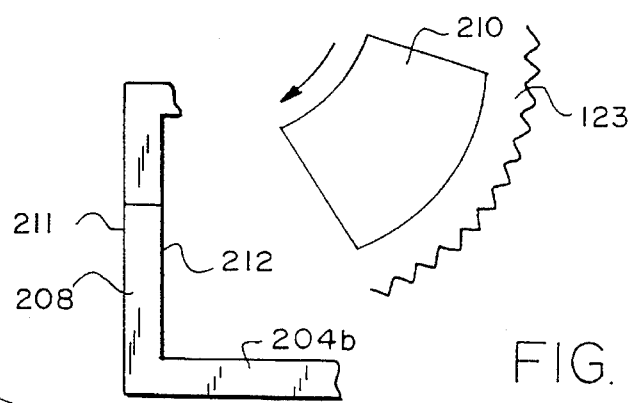
Figure 16C:
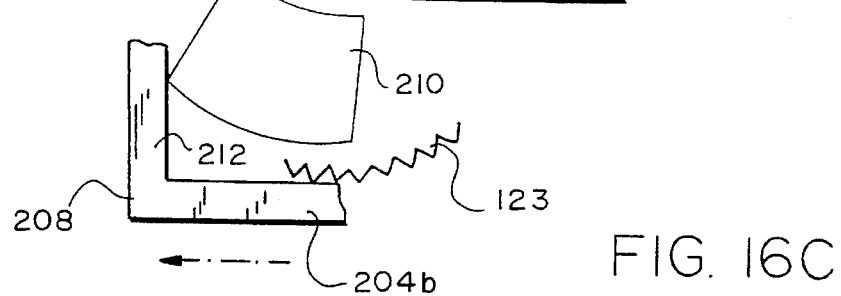
Figure 16D:
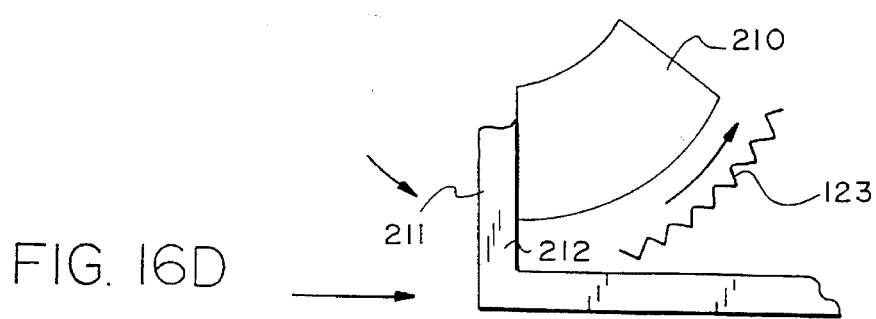
Figure 17B:
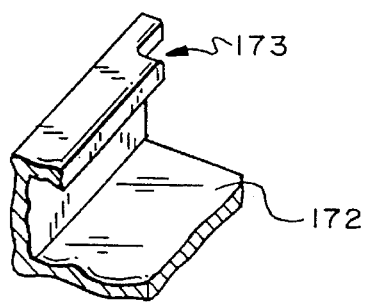
FIG. 17B is a fragmented side elevational view of the shuttle assembly tray linkage arrangement.
Figure 17A:
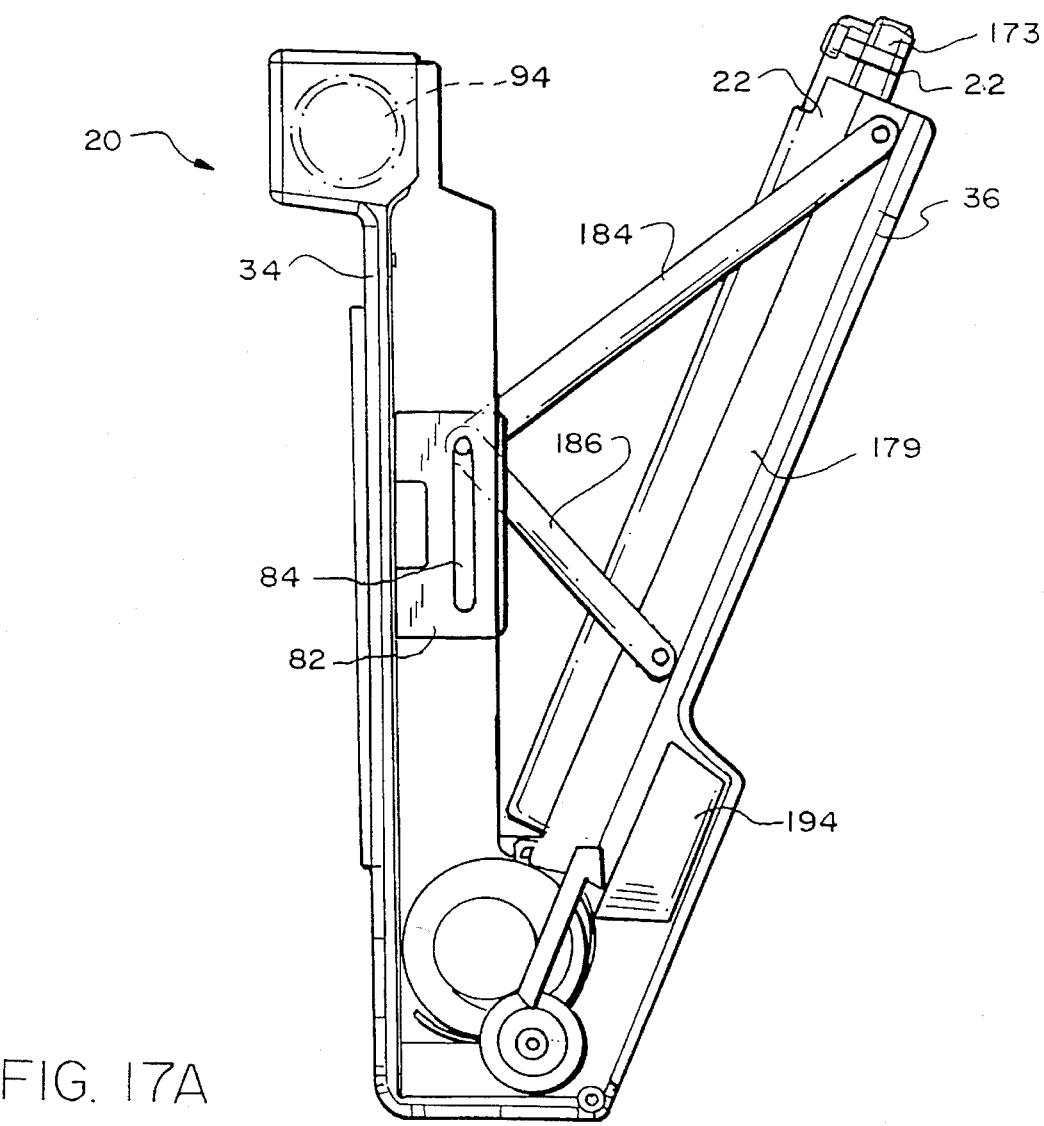
FIG. 17A is an enlarged and fragmented view of a stop feature on the tray which cooperates with the cassette.

Reference is made to FIGS. 2, 4–6, 12 & 17 which illustrate the housing assembly 32 and a tray and an erectable linkage assembly 170 both of which are operable together for receiving the cassette 22 in a loading position and for moving the tray and loaded cassette to a second position. In this second position, the cassette is in place relative to the shuttle for either exposure or processing. As seen in FIG. 2, the tray 172 has a central wall and upstanding therefrom a pair of sidewalls having rails which accommodate the cassette. One of the side rails adjacent its upper portion has formed thereon a tab stop structure 173 (FIG. 17A) in the form of lateral protrusion which sized and located so as to contact cassette structure for insuring that the cassette cannot be loaded in either a backward or inverted position. The stop also functions to limit downward movement of the cassette relative to the tray. The bottom tray wall has upper and lower pairs of integral spring tabs 174 extending therefrom for loading the cassette against the housing datums adjacent a film plane for proper exposure of the film. The tray 172 includes side rivets 176 which ride in elongated guide tracks 178 formed in side rails 179 on the back cover 36 for guiding the tray. The tracks 178 are inclined slightly from the mouth of the shuttle opening so that the tray can present the cassette to a desired orientation relative to the shuttle housing during loading. A detenting portion 180 having the enlarged radius configuration, such as depicted in FIG. 12 allows a rivet to temporarily remain therein when the shuttle is open for resisting sliding of the tray. A linkage assembly 182 includes a pair of long links 184 and a pair of shorter links 186 pivoted together as shown in FIG. 17, so as to pivot and slide along the slots 84. One opposite end of each of the long links 184 is pivotally connected to sidewall holes 184a on the back cover 36 and each of the short links has its other end pivoted to the lower sidewall rivets 176 on the tray 172. The linkage assembly 182 allows the tray 170 to move to a loading position, whereat an end portion of the cassette 22 protrudes above the tray and the shuttle housing by a distance which facilitates the user being able to easily grasp the cassette for either insertion or removal. When both the covers 36, 38 are closed the linkage assembly 182 operates to displace the tray 170 inwardly and downwardly by a desired amount, whereby the cassette is moved to a film exposing position. The stop 173 limits downward movement of the cassette on the tray, whereby the negative exposure opening 50 is properly aligned for exposure of the image area and that the pick slots of the negative cassette are aligned with the noted pick slots of the shuttle.

Reference is now made to FIGS. 12–17 for showing an automatic exposure counter assembly 190. The exposure counter assembly 190 includes a counterwheel 192 mounted for rotation on the inside of the back cover 36. A counterspring (not shown) is interconnected between the cover and the counterwheel for rotatably biasing the latter in one direction of rotation. The counterwheel 192 has a plurality of ratchet teeth 194 on its upper end for engagement by both a holding pawl 196 and an advancing pawl assembly 198. The holding pawl 196 is defined by a leaf spring having its proximal end connected to the back cover and its distal end 200 urged into positive holding engagement with selective ones of the ratchet teeth 194 in response to downward sliding engagement by the tray 170, as when the shuttle housing is being closed. In this regard, the holding pawl 196 has a bowed central portion 202 which is engaged by the tray during the latter's downward movement. The holding pawl 196 will disengage the counterwheel 192 under its inherent resiliency when the tray moves to an upward non-engaged position, such as when the shuttle housing is opened.

Reference is made to FIGS. 13–16 A–D for illustrating the advancing pawl assembly 198. The spring biased advancing pawl assembly 198 includes a body 204 mounted on the cover back for limited reciprocatable movement. The body 204 has an elongated portion with a depending pawl 206 that engages selected ones of the ratchet teeth 194 for driving the latter in response to longitudinal displacement of the body, as will be described. In this regard, the pawl body 204 has a boss engaging portion 208 that is engaged on opposite sides thereof by a stop boss 210 protruding from the stop gear 123. The advancing pawl advances linearly in response to engagement by the stop gear boss 210. As noted, the stop gear 123 is rotatably mounted on one of the retainer plates 72 and is in meshing engagement with the pinion 122 whereby it is rotatably driven by the latter, such as when the blocking assembly moves to its second blocking condition or fully fired position from the first blocking condition. The degree of stop gear rotation is such that the stop boss 210 will have rotated by about 360 degrees, after the blocking assembly has been indexed from its first blocking condition, through its unblocking condition, to its second blocking condition during the exposing cycle. In this latter position of the stop gear, the stop boss 210 will engage a surface 211 of the boss engaging portion 208, see FIG. 16 A. Since the stop boss 210 and hence the meter gear 123 are limited from further rotational displacement in this direction, the blocking assembly cannot rotate in such direction. This condition has the advantage of preventing further firing of the blocking assembly. Hence, an operator cannot inadvertently put the shuttle 20 back into the adapter to take another exposure because the blocking assembly is prevented from further rotation in the exposing direction. As noted, after an exposure, the blocking assembly is recocked. An explanation of recocking follows prior to an explanation of how so as to explain advancement of the counter assembly indicates exposure.

Figure 18:
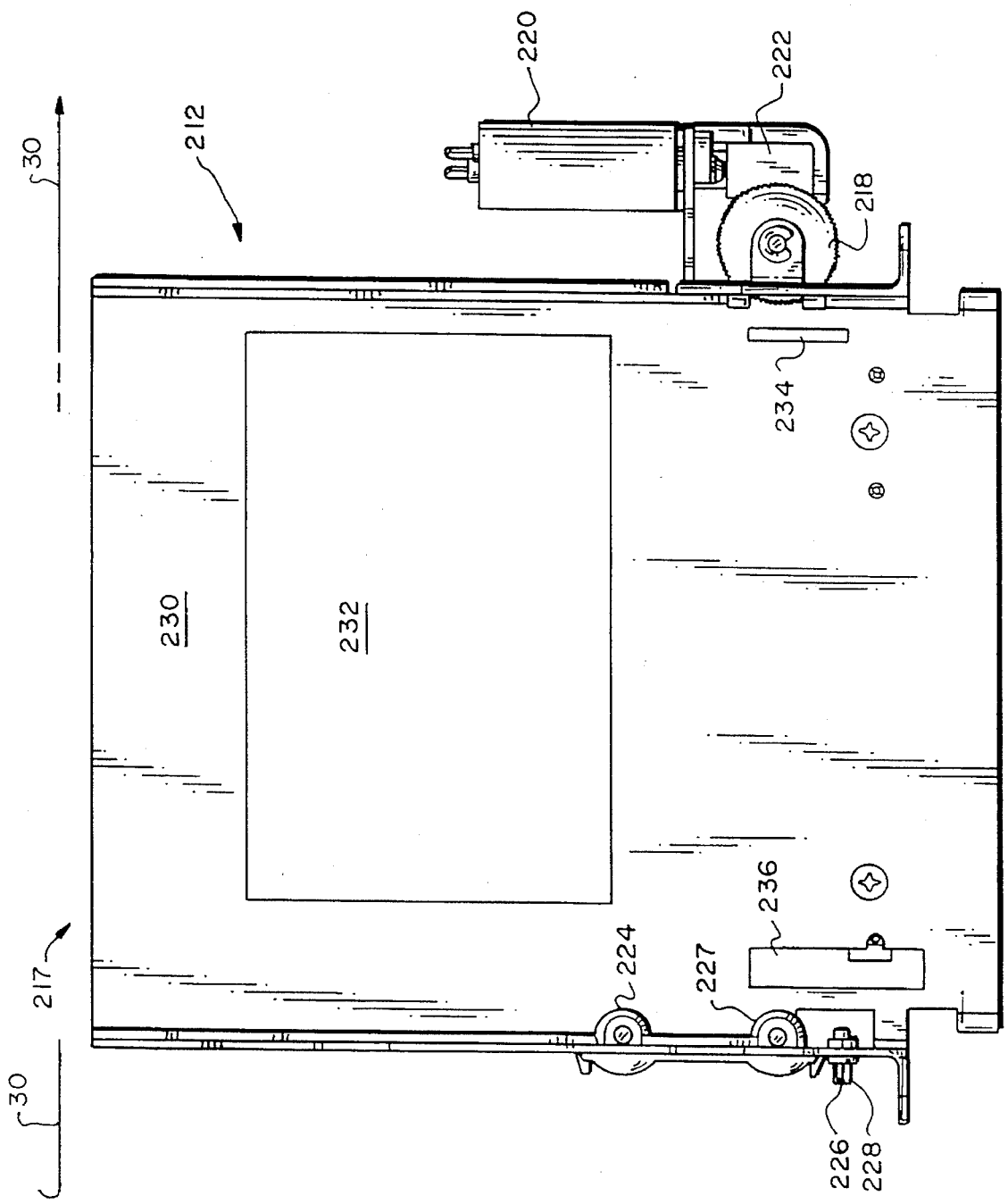
FIG. 18 is a side elevational view of a portion of a shuttle feeding mechanism in a film processor for the shuttle.
Figure 19:
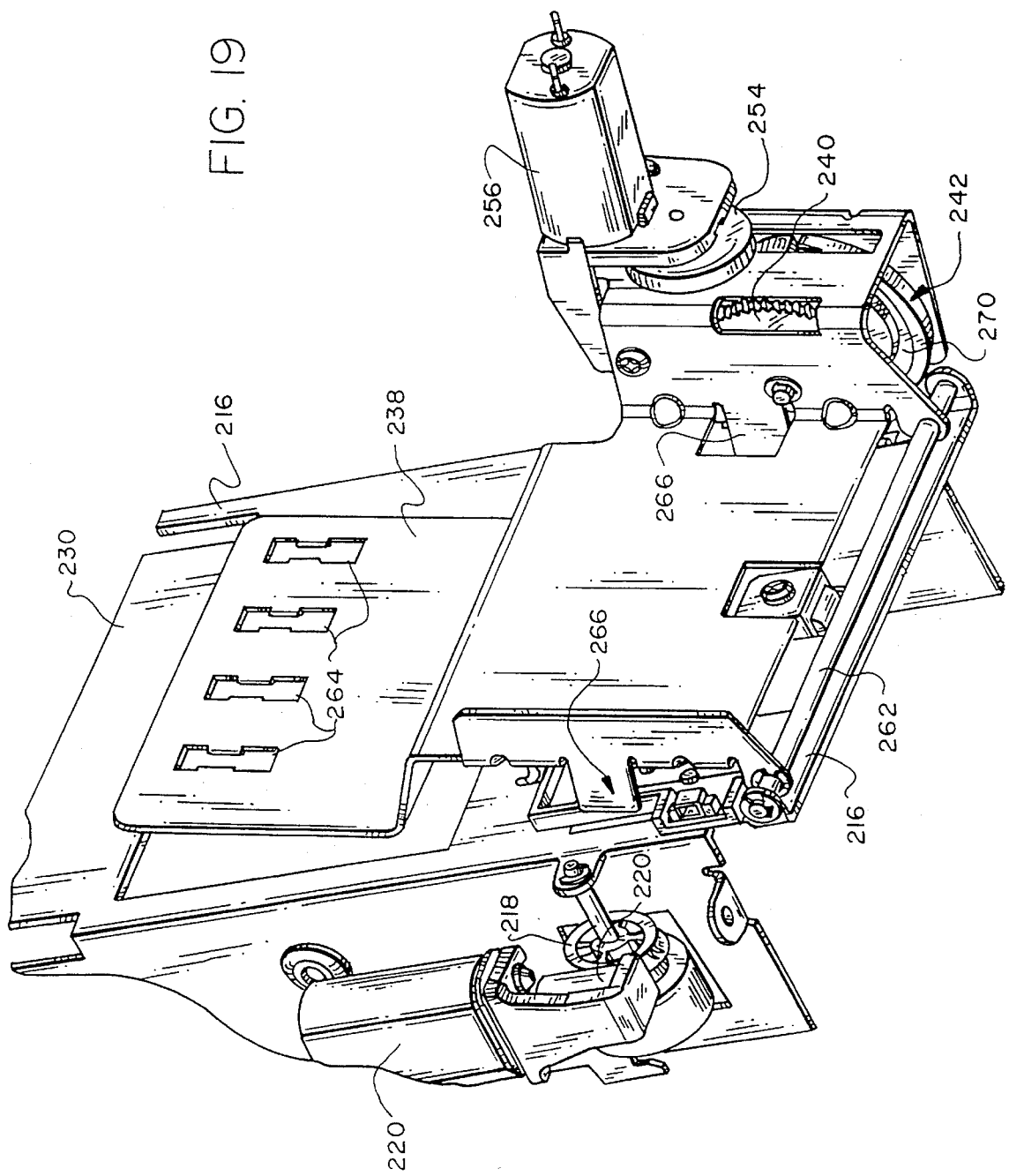
FIG. 19 is a perspective view of a recocking mechanism located in a processor for recocking the dark slide of the shuttle.
Figure 20:
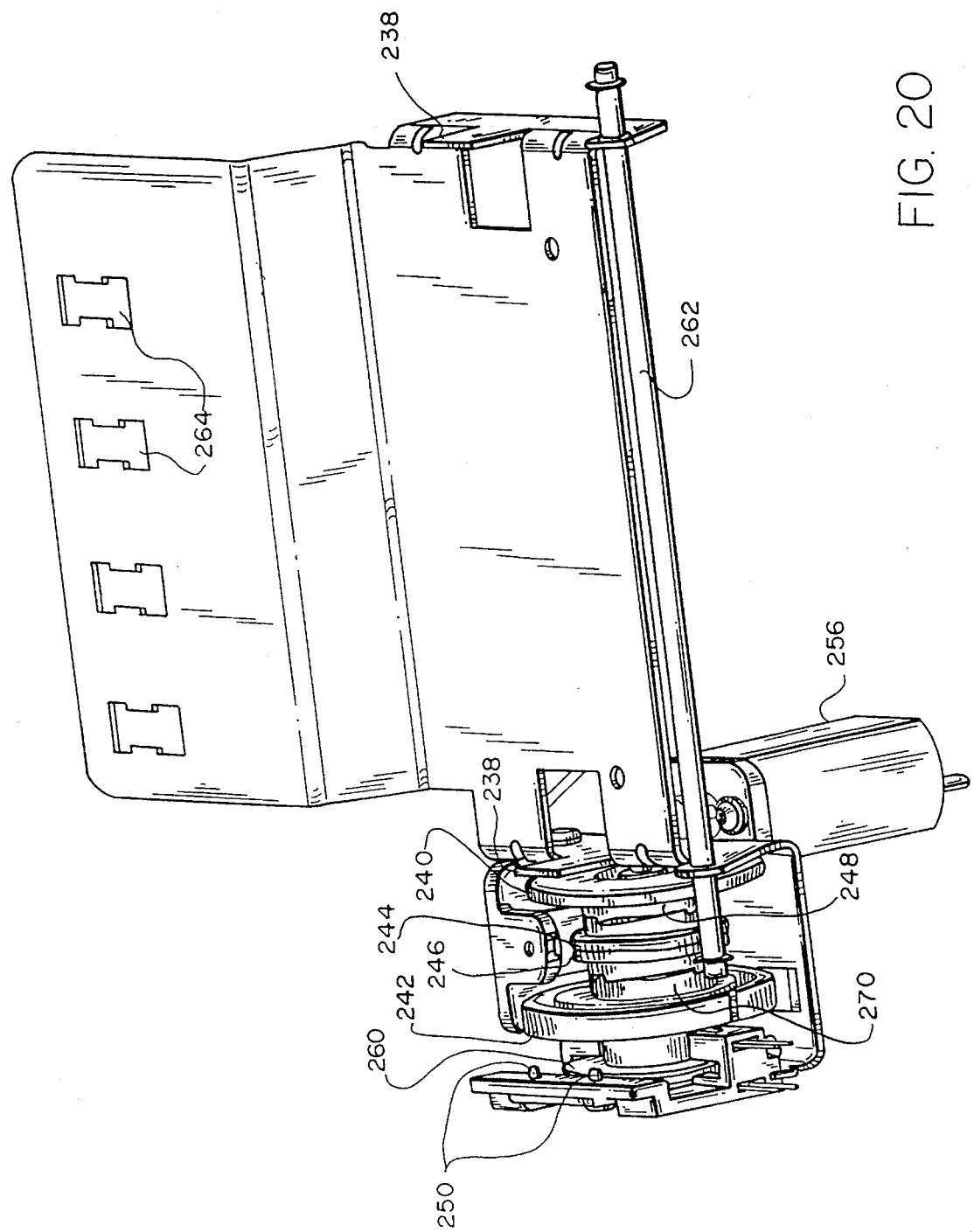
FIG. 20 is an enlarged schematic perspective view of components of the recocking mechanism.

Reference is now made to the recocking of the blocking assembly. This occurs after the shuttle has been removed from the adapter and placed in operative relationship to the processor. FIGS. 18–20 depict aspects of shuttle loading and recocking mechanisms 212 and 214; respectively, associated with a processor 30 and which positively cooperate with the shuttle 20. Basically, the shuttle loading mechanism 212 is operated to accept the shuttle assembly 20, after it has been inserted into a processor inlet opening, and move it automatically towards a processor in place position, whereby the exposed film unit is to be ejected for processing. In this regard, the recocking mechanism 214 is operable to cooperate with the shuttle's escapement mechanism and the supply roller assembly to drive the blocking assembly. In a first instance, the recocking mechanism advances the blocking assembly partially back to its partially unblocking position (FIG. 7D), whereat the film unit can be ejected from the cassette by the pick 56 engaging a film pocket 24b. The recocking mechanism 214 is then operated to return the blocking assembly to its first blocking condition; whereat the blocking assembly is ready for another exposure.

As seen in FIG. 18, the shuttle loading mechanism 212 includes an upright shuttle receiving bracket 216 having a U-shaped configuration which is vertically fixed adjacent a shuttle insert and removal opening 217 in the processor 30.

An electric drive motor 218 is mounted on one sidewall of the bracket 216 and is operable to rotate a friction wheel 220 that is rotatably mounted to the bracket, through a worm gear drive system 222. A portion of the friction wheel 220 extends through a side opening in the bracket sidewall and frictionally drives the shuttle 20. The friction wheel 220 can drive the shuttle downwardly to a shuttle in place position within the processor, and an upwardly to a shuttle loading/removal position. The processor includes appropriate photodetector sensing devices for indicating the noted sensed positions of the shuttle. A pair of idler rolls 224 are mounted on an opposite receiving member sidewall for engaging the shuttle and thereby facilitating vertical movement of the latter.

The bracket 216 is also formed with a fixed cam follower 226 which protrudes from a sidewall and has a flat peripheral portion 228 which cooperates with the recocking mechanism 214. A bracket back wall 230 is provided with an opening 232 for allowing sensing beams (not shown) associated with the photodetectors (not shown) on the recocking mechanism to cooperate with encoding features 233 (FIG. 2) on the cassette. The back wall 230 includes an interlock opening 234, and a combination interlock and recocking gear opening 236.

Figure 21:
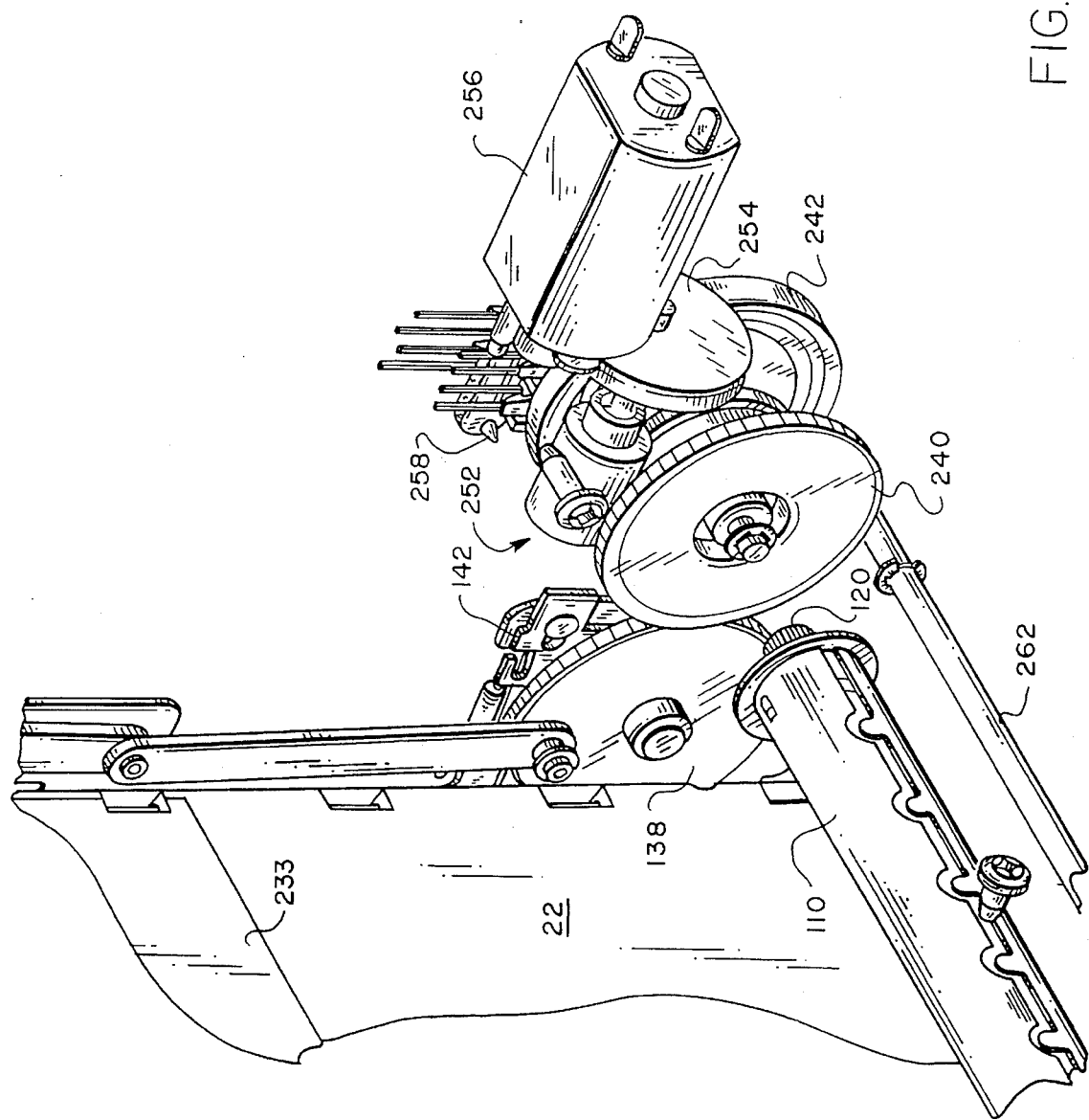
FIG. 21 is an enlarged and fragmented view of other components of the recocking mechanism.
Figure 22:
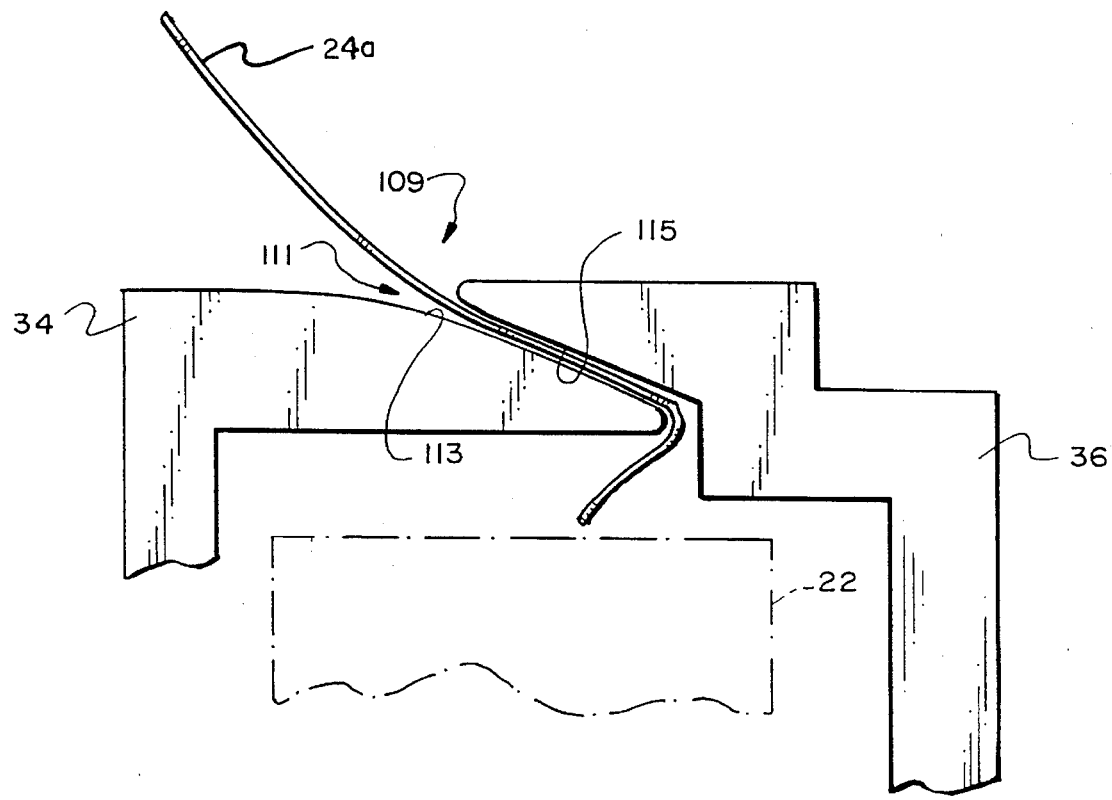
FIG. 22 is an enlarged and fragmented view showing a guiding arrangement on the shuttle housing for guiding for a film safety cover associated with the film.

Reference is now made to FIGS. 19–21 for describing the recocking mechanism 214. The recocking mechanism is basically operable after the shuttle has been advanced to its processor inplace position. The recocking mechanism 214 includes a recocking bracket plate 238, a recocking gear 240 having a coaxial, a camming gear mechanism 242, split worm gears 244, 246, each split worm gear having an associated therewith a one-way clutch 248, 250 which is biased thereagainst; respectively, a worm gear drive unit 252, a gear reduction unit 254, a reversible electric motor 256, photodetectors 258 and an encoding system 260 for determining the angular position of the and thereby whether the bracket is in its retracted or cassette engaged position. The recocking bracket 238 has a pivot shaft 262 connected to the shuttle receiving bracket 216. As will be explained, the recocking bracket plate 238 is pivotally movable between a spaced away position (not shown) and a recocking position. The bracket 238 includes four photodetector openings 264 which allow processor photodetectors (not shown) to read encoding features carried by the back of the cassette for determining the type of negative film carried therein. In this regard, the encoding features are aligned with a negative cassette reading window 255. The bracket 238 includes a pair of interlock tabs 266 which project through the openings 234,236; when the recocking bracket is in its recocking position. In this bracket position, the interlock tabs 266 also project through interlock slots 265 (FIG. 2) in the back cover 36 for positively locking the shuttle to the processor, thereby preventing inadvertent shuttle removal.

The recocking bracket 238 is operable to move from its spaced away position to its recocking position whereby it engages the shuttle received within the bracket 216. The bracket 238 so advances when the recocking motor 256 drives the camming gear 242 in one direction of rotation through the worm gear arrangement 246. The cam follower 226 on the bracket 216 rides within a cam track 270 of the rotating camming gear 242. As a result, the bracket 238 pivots about its pivot shaft 262 as the cam follower 226 rides within the cam track 270. It should be noted, that as the camming gear 242 rotates the recocking gear 240 remains stationary because the clutch 248 does not transfer the rotational drive from the motor 256. After this pivoting, the noted interlock tabs 266 cooperate with the slots 265 in the shuttle housing for preventing shuttle removal from the processor. This prevents inadvertent damage to the shuttle and the processor if an operator starts to pull on the shuttle while processing is occurring in the processor. The photodetectors 258 in combination with the encoding system 260 detect when the bracket 238 is in the recocking position, whereat the recocking gear will be rotated by the motor 256 driving in an opposite direction. When it is desired to eject a film unit, the recocking motor 256 rotates in a recocking direction, which is in an opposite direction from that direction which drives the bracket 238 to the recocking position. The recocking rotation is limited for effecting movement of the blocking assembly to its partially unblocked condition wherein picking of the film unit by the picking mechanism 56 will occur. It should be noted that during this recocking rotation, the camming gear 242 does not rotate by reason of the one-way clutch 248, but the split worm gear 244 rotates through the one-way clutch 250. This, in turn, rotates the recocking gear 240. In this embodiment, predetermined rotation of the recocking gear 240 will cause the meter gear 138 and hence the supply roller assembly to rotate in the opposite direction or recocking by a preselected amount. This will be effective for rewinding the curtain 90 onto the supply roller assembly until the curtain aperture 98 is in at least partial registry with the aperture 64 and the exit slot 68. In such an intermediate curtain position, the film pocket 24b can be picked by the processor picking mechanism 56 (FIG. 6) extending through the slots of the cassette, the shuttle housing and the main frame assembly to thus drive the film unit from the cassette and shuttle.

Once the processor detects that the negative film unit has been sufficiently withdrawn from the shuttle, the recocking motor continues to rotate in the same direction. Accordingly, the recocking gear will drive the meter gear 138 further in the recocking direction until the curtain 90 returns to its first blocking condition; whereupon the photodetectors sense such conditions and halts rotation of the recocking motor.

As noted, the recocking operation is effective for advancing the exposure counter assembly. In this regard, the noted recocking of the supply roller assembly will simultaneously rotate the stop gear 123 in a recocking direction by more than about 360 degrees, opposite to that than during firing of the curtain, such that the stop gear boss 210 will overtravel. During this overtravel the stop gear boss 210 engages the opposite side 212 of the boss engaging portion 208 for driving the advancing pawl body 204 downwardly by a predetermined amount as viewed in FIG. 13. As a result, the pawl 206 (FIG. 15) engages the next ratchet tooth 194 thereby rotating the counterwheel 192 an appropriate amount, whereby the next incremented indicia number 272 will be visible through a housing display window 274. The recocking motor 256 will reverse direction at the sensed end of the recock stroke to a position so that it will be properly located for the next operational cycle. The advance pawl return spring 275 will be effective for returning the advance pawl body 204 back to its original position when the stop no longer engages the body 204. The pawl 206 will be lifted from the ratchet teeth by the camming surface 277, see FIG. 13. After the recocking motor has been halted following recocking as noted, the recocking motor 250 is operated so as to rotate the camming gear in the opposite direction. Because of the one-way clutch the recocking gear will not rotate but only the camming gear. The cam follower which cooperates with the camming gear causes the bracket plate to pivot to its initial spaced away condition. During this latter movement of the bracket plate, the interlock tabs 266 are withdrawn from the shuttle interlock slots 265 thereby freeing the shuttle for withdrawal from the processor by operation of the shuttle loading mechanism. Thereafter, the shuttle drive motor 218 can be actuated so that the friction wheel drives the shuttle upwardly for removal from the processor by an operator. As such, the shuttle is ready for another exposure mode.

Figure 26:
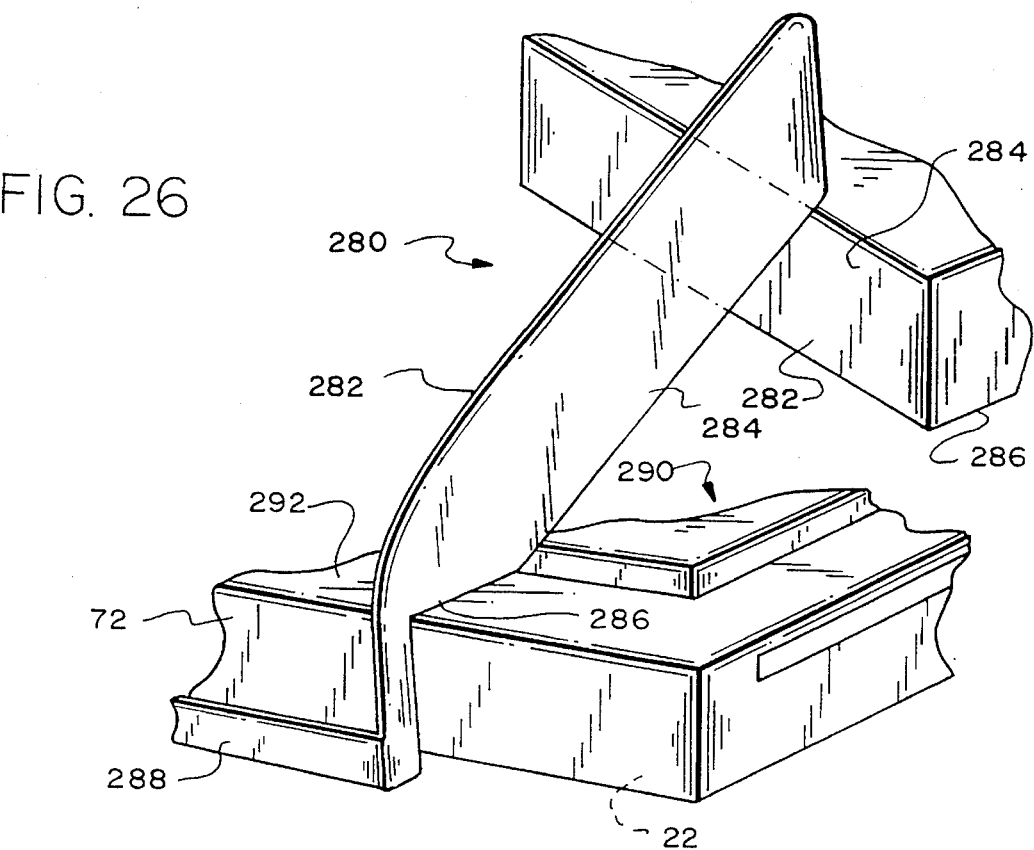
FIG. 26 is schematic view of a cassette shielding arrangement shown in an operative erect condition.

Reference is made to FIG. 26 for illustrating one embodiment of a shuttle shielding arrangement 280 that is operable automatically between an erect position which occurs when shuttle is in its open condition; and a collapsed position, shown in phantom lines, when the shuttle housing is closed. Essentially, the shielding arrangement 280, when in the erect position, functions to allow insertion of the cassette 22 in only the tray 172 and simultaneously prevent inadvertent insertion of the cassette into other areas of the open shuttle. In this regard, the shielding arrangement includes a pair of shielding members 282, each of which is located on an opposite side of the tray. Each of the shielding members 282 includes a vertically oriented shield plate 284 having a cut-out area 286 with a preselected configuration. The plate 284 is torsionally connected to an elongated arm 288 which is adapted to extend along the axial extent of and is connected to the back cover. The plates 284 move generally vertically relative to each other as seen in the drawing, such that the cut-out areas 286, when the plates are erect, cooperate with each other to define a cassette opening 290. The cassette opening 290 is adapted to be aligned with a mouth 292 of the tray 172 and has a size and configuration which allows negative cassette insertion and removal therethrough. The shield plates 284, when erect, prevent inadvertent insertion of the cassette into other portions of the open shuttle. The plates 284 are normally torsionally biased to assume their angular orientation, as illustrated by the solid lines, with their respective arms 288. When the plates 284 are displaced downwardly (not shown), as when the back cover closes, the plates torsionally rotate relative to their respective arms to a collapsed condition as indicated by the phantom lines. In this position they do not interfere with the operation of the shuttle. When the shuttle opens, the plates 284 are free to rotate relative to each other and their arms to their erect unblocking condition.

Figure 23:
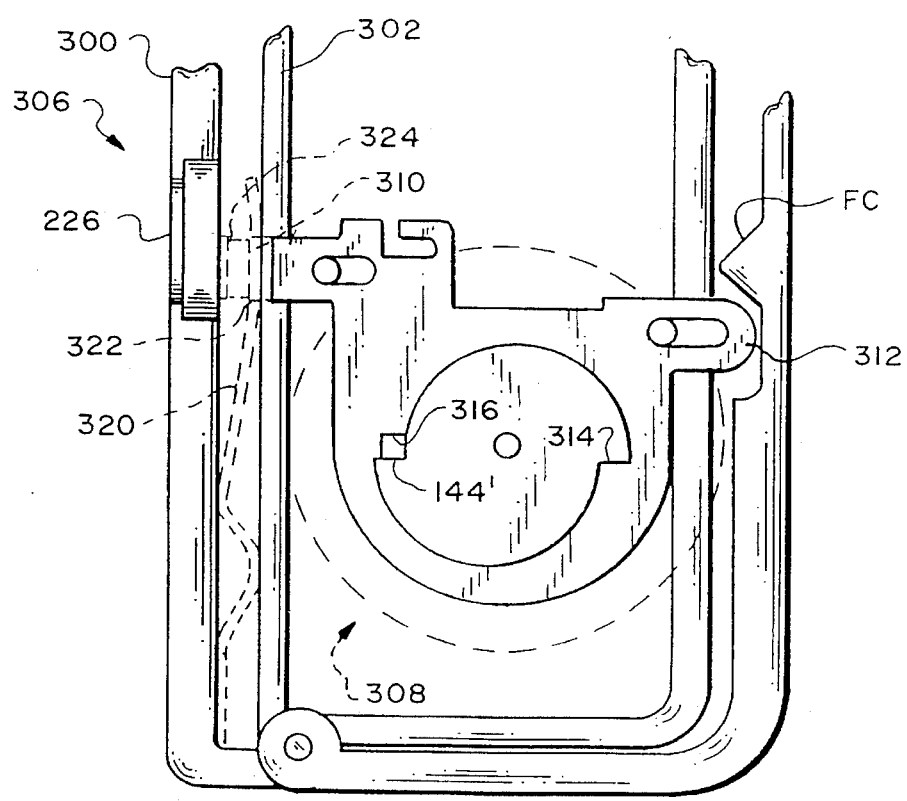
FIG. 23 is a side elevational view of another shuttle embodiment which cooperates with a locking mechanism in a camera adapter for releasably securing the shuttle in place.
Figure 24:
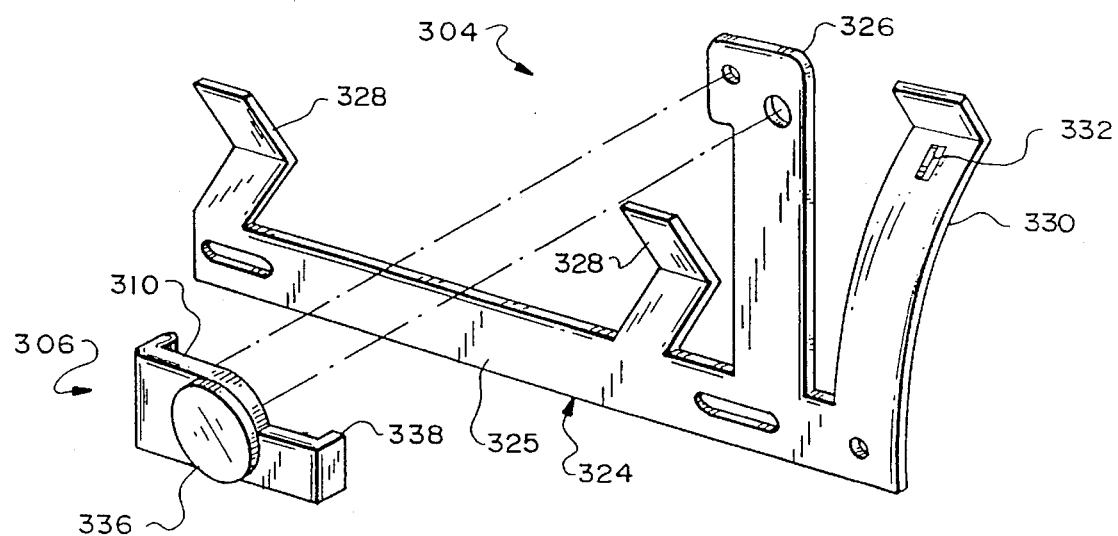
FIG. 24 is an enlarged perspective of a releasing assembly associated with the adapter locking mechanism for releasably locking the shuttle in the adapter.
Figure 25:
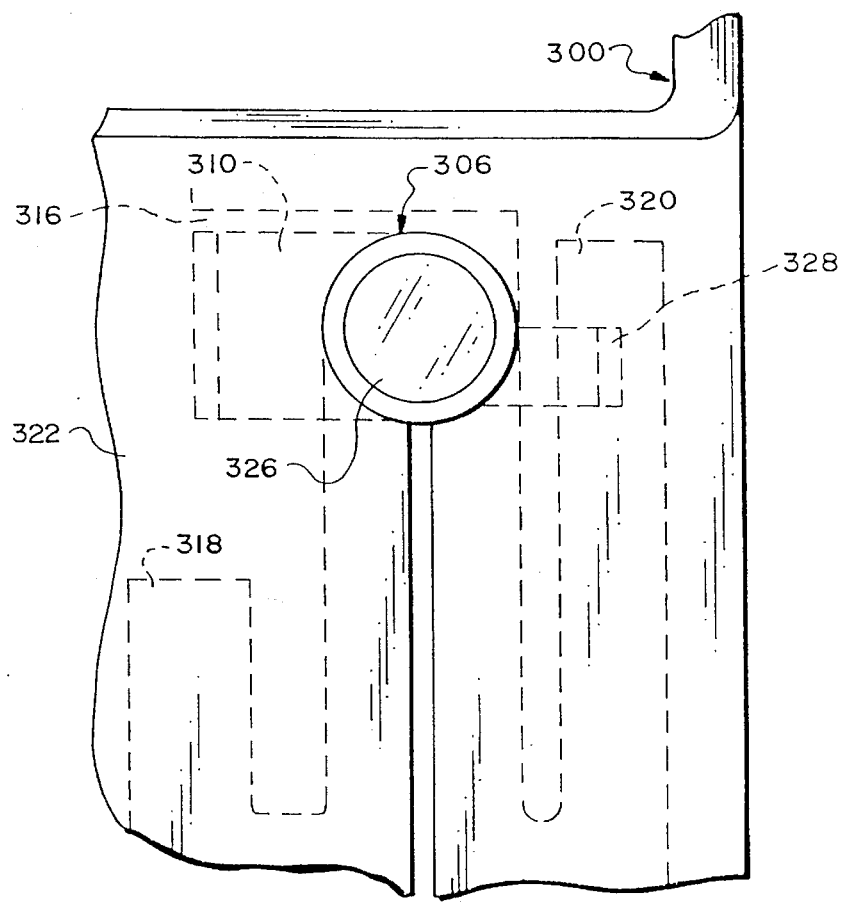
FIG. 25 is an enlarged and fragmented view of the releasable button assembly used in the locking mechanism.

Reference is now made to FIGS. 23–25 which illustrate another embodiment of an adapter 300 which cooperates with another embodiment of a shuttle assembly 302. Both the adapter and the shuttle are similar to those described earlier, but with certain changes made. Basically, the adapter has added thereto a releasable locking assembly 304 automatically lockable to the shuttle 302 so as to restrain undesired withdrawal movement of the latter. The locking assembly is described in more detail in the CAMERA ADAPTER AND METHOD application. Only those details thereof necessary for understanding this embodiment will be given. The locking assembly is released by an operator pressing a releasing button assembly 306 on the adapter 300 which when released serves to release an escapement mechanism 308 in the shuttle, thereby freeing the shuttle for withdrawal.

The escapement mechanism 308 of this embodiment is different from the other embodiment as will be described. The mechanism 308 includes a bistable escapement plate 142' which has a pair of tabs 310 and 312 which are alternately extendible from the housing and actuatable as will be described for advancing the plate 142' between each of its two operating positions. In this embodiment, the plate 142' has a pair of stop shoulders 314,316 spaced about 180 degrees from each other and the meter gear 138' has a single stop 144'. The stop 144' will alternately engage the shoulders 314,316 to provide the 180 degree incrementing as did the above described embodiment of the escapement mechanism. For releasably holding the plate 142' in either of its two positions there is provided a pair of bowed springs (not shown) which engage the plate 142' so as to maintain the latter in frictional engagement with the retainer plate. The force of the springs will maintain the plate in either of their two positions so as to maintain the plate 142' in its two stable positions.

Figure 27:
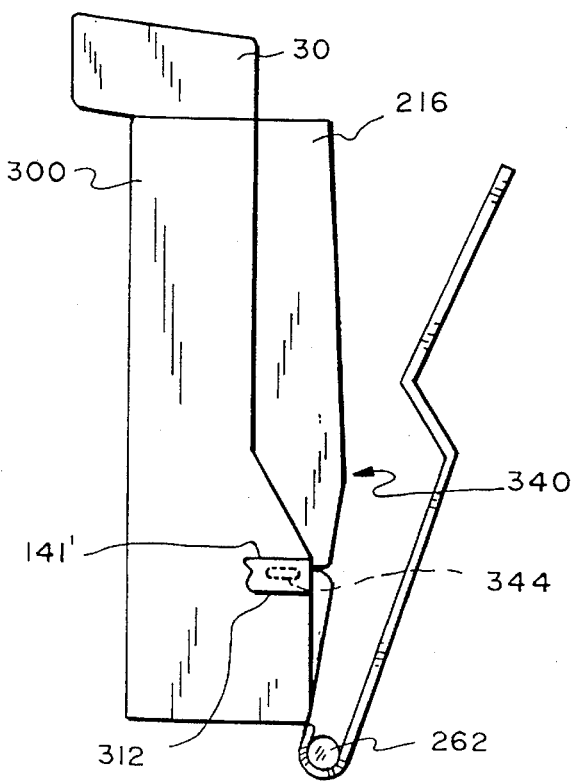
FIG. 27 is a schematic view of a leaf spring mounted on the bracket for biasing an escapement mechanism of the last noted embodiment.

Reference is made back to the releasing assembly which has a main body portion 320 which is mounted for limited sliding movement in a front wall 322 of the adapter 300. The locking assembly 304 includes an integral locking member 324 having an elongated base 325 which is secured to a bottom inside portion of the front wall of the adapter. Extending from the base 325 is an upstanding leaf spring portion 326 which engages the button assembly 306 for biasing the latter backwardly or to the front of the wall 322. The locking member 324 includes a pair of shuttle biasing leaf springs 328 which bias the shuttle toward the adapter datums for properly locating the shuttle for film exposure. The locking member 324 also includes an upstanding escapement latch 330 having a bent shape, as shown, and including a latch opening 332 arranged to cooperate with an escapement tab 310 of the escapement mechanism 308. After the escapement mechanism has been moved to its fired position, the escapement tab 310 is in the phantom position shown in which it is moved through the opening 332 (FIG. 23). Accordingly, the shuttle cannot be withdrawn from the adapter. However, once a button segment 336 is pressed inwardly against the leaf spring 326, a latch engaging portion 328 engages the escapement tab 310 and displaces the latter in the opposite direction free of the latch opening 332, whereby the shuttle's shutter mechanism (not shown) can close because the stop 144' can rotate 180 degrees for cooperation with the stop shoulder. This will index the blocking mechanism to its exposure prevention or termination condition. Of course, once the manual pressure is removed from the button segment 336, the leaf spring 326 urges the former outwardly and the portion 338 is removed from the latch opening. This frees the shuttle for removal. FIG. 27 shows a leaf spring 340 mounted on the bracket 216 and having a portion 342 extending through a bracket opening 344 for engaging and loading of the escapement plate when the recocking bracket 238 has been moved to the operative position.

The present invention may be embodied in other specific forms without departing from the spirit or central characteristics thereof. The present embodiments, are therefore, to be considered in all respects as illustrative and not restrictive. The scope of the present invention being indicated by the appended claims rather than by the foregoing description and all changes which come within the meaning of the range of equivalency of the claims are therefore intended to be embraced therein.

What is claimed is:

1. Apparatus for use in shuttling at least a photosensitive film unit housed in a film container, wherein the container includes an exposing opening, between an image recording apparatus whereat a film unit can be exposed, and a film processing apparatus wherein the film can be removed for processing, said film shuttling apparatus comprising:

a portable lighttight housing assembly which removably receives the film container therein, said housing assembly includes an exposure aperture registerable with the container exposing opening when the container is received within said housing assembly for allowing exposure of a film unit by image bearing light presented at the exposing opening;

said housing assembly being cooperable with an image recording apparatus in an exposing mode of operation, and with a film processing apparatus in a processing mode of operation;

blocking means coupled to said housing assembly and operable automatically for changing conditions between light blocking and unblocking conditions relative to said exposure aperture, wherein when in said unblocking condition image bearing light can expose the film unit; and, controlling means operatively connected to said blocking means and being actuatable when in operative relation with the image recording apparatus for changing conditions of said blocking means between said light blocking and unblocking conditions for allowing and preventing exposure of a film unit.

2. The apparatus defined in claim 1 wherein said blocking means is movable between a first light blocking condition, said unblocking condition, and a second blocking condition; wherein when said controlling means is in operative relation with the image recording apparatus, said blocking means moves from said first blocking condition to said unblocking condition for exposing the film unit, and moves from said unblocking condition to said second blocking condition for preventing exposure.

3. The apparatus defined in claim 2 wherein said controlling means is operable when in operative relationship with a processor for changing said blocking means from said second blocking condition to at least said first blocking condition.

4. The apparatus defined in claim 3 wherein the film container has an exit slot through which a film unit can be removed and said housing assembly has an exit for allowing the film unit to be removed therethrough from the film container exit; said controlling means being actuatable for driving said blocking means to at least a partially unblocked condition when said housing assembly is in an operative relationship with a processor so that a processor force transmitting mechanism can engage and force a film unit through said housing slot from the container slot; and said controlling means being actuatable to move said blocking means back to said first light blocking condition from said partially unblocked condition prior to said housing assembly being moved out of operative relationship with the processor; whereby said blocking means is ready for another exposure.

5. The apparatus of claim 4 wherein said blocking means comprises shutter means including at least a shutter aperture for allowing light to pass therethrough, said shutter aperture positionable in non-light passing relationship to said exposure aperture when said blocking means is in said first or second light blocking conditions, and said shutter aperture being in light passing relationship to said exposure aperture to allow film exposure when said blocking means is in said unblocking condition.

6. The apparatus of claim 5 wherein said housing assembly includes frame means and said shutter means comprises an opaque and wrappable curtain wherein said shutter aperture is formed in said curtain; and said blocking means further includes a supply roller assembly and a takeup roller assembly, said supply and takeup roller assemblies rotatably mounted on said frame means, and said curtain being wrappably connected to and between said roller assemblies whereby said shutter aperture is movable between said first and second light blocking conditions and light said unblocking condition in response to rotation of said roller assemblies; said curtain being held in lighttight relation to said frame means.

7. The apparatus of claim 6 wherein said opaque curtain is comprised of an elongated strip of flexible, lightweight, and low coefficient friction material that has each of its leading and trailing end portions attached to a respective one of said supply and takeup roller assemblies.

8. The apparatus of claim 7 further including stiffening means attached to said curtain at positions adjacent each leading and trailing edge portion of said shutter aperture in a direction of curtain travel between said takeup and supply roller assemblies for resisting tearing of said curtain during movement of said curtain.

9. The apparatus of claim 2 further includes positioning means operatively associated with said blocking means for enabling the formation of signal information to a sensor assembly for indicating the operational conditions of said blocking means.

10. The apparatus of claim 5 further includes positioning means operatively associated with said curtain for enabling the formation of signal information to a sensor assembly for indicating different operational conditions of said curtain, said positioning means comprises apertures in said curtain spaced at intervals along the length of said curtain, wherein said curtain apertures correspond to said different conditions of said blocking means; said positioning means including housing assembly apertures which permit passage of detecting beams therethrough and which are alignable with said curtain apertures.

11. The apparatus of claim 6 wherein said supply roller assembly includes tubular means about which a portion of said curtain is wrappable; a shaft assembly connected to said housing assembly and disposed rotatably within said tubular means; and, a pair of end cap members rotatably mounted on said shaft and being secured to and within a respective open end portion of said tubular means.

12. The apparatus of claim 11 wherein each one of said supply end cap members is connected to a pinion gear so as to be rotated therewith, wherein one of said pinion gears is adapted for coupling engagement with said controlling means.

13. The apparatus of claim 12 wherein said takeup roller assembly includes tubular takeup means about which said curtain is wrappable; a takeup shaft assembly connected to said housing assembly and rotatably mounted within said tubular takeup means; and, a pair of takeup end cap members rotatably mounted on said takeup shaft assembly, each of said takeup end cap members is engaged for rotation with said takeup tubular means; and, biasing means operatively connected to and between said takeup tubular means and said takeup shaft assembly for providing a biased preloaded rotational force which rotates said takeup tubular means and thereby advances said curtain and rotates tubular supply means.

14. The apparatus of claim 2 wherein said controlling means includes escapement means mounted on said housing assembly and directly coupled to said blocking means such that in response to actuation thereof it is effective for indexing movement of said blocking means from said first blocking condition to said unblocking condition, and to said second blocking condition and controls movement of said blocking means from said second blocking condition to said first blocking condition.

15. The apparatus of claim 14 wherein said escapement means includes a biased escapement body assembly mounted on said housing assembly for movement between locking and unlocking positions; meter gearing means mounted on said housing assembly; and, biasing means connected to said body assembly; said meter gearing means being mounted for rotation on said housing assembly, and being rotated in one direction in response to movement of said blocking means and includes first and second stop protrusions on a surface thereof; said biasing means for urging said body assembly to said locking position, whereat said body assembly is engageable alternatively with selected ones of said first and second stop protrusions to thereby halt rotation of said gearing means and any movement of said blocking means; said body assembly is engageable with the firing mechanism of the image recording apparatus and being movable against the urging of said biasing means for moving to said unlocking condition to disengage one of said stop protrusions for allowing rotation of said gearing means and for allowing movement of said blocking means.

16. The apparatus of claim 8 wherein said housing assembly includes a display window and wherein said curtain has indicia thereon which is registerable with said display window so as to be visible.

17. The apparatus of claim 8 wherein said curtain has indicia on predetermined positions thereof, said indicia is alignable with and will be visible through said exposure aperture and the exposing opening when said blocking means is in said first and second blocking conditions to thereby visually indicate the operative conditions of said curtain to an operator.

18. The apparatus of claim 15 wherein said meter gearing means is selectively cooperable with a recocking mechanism of a processor so as to be rotated by the recocking mechanism in an opposite direction to said one direction, and thus rotate said supply roller assembly for moving said curtain from said second unblocking condition back to said first unblocking condition.

19. The apparatus of claim 1 further including exposure counting means operatively connected to said housing assembly and said blocking means and being operable in response to movement of said blocking means for displaying the number of film units which have been exposed.

20. The apparatus of claim 5 wherein said housing assembly includes first and second cover members hingedly connected to each other for movement between an open or film insertion condition and a closed lighttight or operating condition; and, a main frame assembly connected to one of said first and second cover members, said main frame assembly including a window which is registerable with the container exposing opening and said exposure aperture when said first and second cover members are in said closed condition.

21. The apparatus of claim 20 wherein said first cover member and said main frame assembly each includes a pair of pick slots, said pairs are sized and oriented to extend along a portion of the respective longitudinal extents of said first cover member and said main frame assembly, said pairs of pick slots are aligned with each other and a pair of pick slots formed in the film container when said first and second cover members are in said closed condition for allowing a picking mechanism of a processor to mechanically pick a topmost film housed in the film container.

22. The apparatus of claim 20 further including a film container receiving tray movably mounted to said second cover member and being sized to removably receive a film container therein, and an erecting means operatively connected to and between said tray and said housing assembly for moving said tray between an upper film loading position, and a lower or film exposing position, whenever said first and second cover members move between said open and closed conditions; respectively.

23. The apparatus of claim 22 wherein when said tray is in said loading position, said tray can receive a film container therein in such a manner that an operator can easily grasp an end of a film container for facilitating easy insertion and removal.

24. The apparatus of claim 22 further including shielding means connected to at least one of said first and second cover members and operable for movement to a first position when said cover members are in said open condition for allowing a film container to be inserted only into said tray, and being movable to a second or collapsed position within said cover members when said cover members are in said closed condition.

25. The apparatus of claim 24 wherein said shielding means includes a pair of cooperating shielding members, each of said shielding members torsionally connected to an anchor which is attached to said housing, each of said shield members has a cutout portion which when said shielding means is in said first position cooperate with each other for defining a passageway in alignment with said tray for allowing a film container to pass therethrough and for otherwise preventing a film container to be inserted between said first and second covers when the latter are in said open condition; said shield members being engageable by one of said first and second cover members for moving to said collapsed position when said cover members move to said closed condition.

26. The apparatus of claim 14 wherein said escapement means includes an escapement body assembly mounted on said housing assembly for movement between two positions; meter gearing means rotatably mounted on said housing assembly and being rotatable in response to movement of said blocking means; and, means connected to said housing assembly for releasably holding said escapement body in either of said two positions; said gearing means includes a stop protrusion on a surface thereof; said body assembly including a stopping portion engageable with said stop protrusion to thereby halt any movement of said meter gear and thereby said blocking means; said body assembly means having first and second portions engageable with corresponding firing mechanisms of the image recording apparatus such that upon said first portion engaging its corresponding firing mechanism said escapement body moves towards said second position and said stopping portion releases said stop for freeing said meter gear means for movement until said stopping portion reengages said stop protrusion; and in response to said second portion being engaged by its corresponding firing mechanism said escapement body moves back toward said first position and frees said stop for allowing movement of said blocking means to said second blocking condition until said stopping portion reengages said stop.

27. The apparatus of claim 1 further including means for engaging said blocking means and for preventing movement of said blocking means in one direction beyond a position at which said blocking means is in said second blocking condition.

28. The apparatus of claim 12 further including exposure counting means operatively connected to said housing assembly and said blocking means and being operable in response to movement of said blocking means for indicating the number of film units which have been exposed; said blocking means including stop gear means rotatably mounted to said housing assembly and being rotatably engageable with the other of said pinions for rotating therewith when said other pinion rotates; a movable indicia bearing member; and, advancing pawl means operatively connected to said housing assembly and which is operably displaced by said stop gear means for displacing said indicia bearing member to another position to thereby indicate that another exposure has occurred.

29. A method for use in shuttling at least a photosensitve film unit housed in a film container, wherein the container has an exposure opening, that is carried by a shuttle mechanism between an image recording apparatus whereat a film unit can be exposed, and a film processing apparatus wherein the film unit can be removed from the film container and the shuttle for processing and wherein the container has an exposure opening, said film shuttling method comprising the steps of:

providing a portable shuttle housing assembly which removably receives the film container therein, wherein the housing assembly includes an exposure aperture registerable with a container exposing opening when the container is received within the housing assembly for allowing exposure of a film unit presented at the exposing opening; providing the housing assembly with a movable light blocking means which is movable between at least first and second light blocking conditions and a light unblocking condition;

placing the shuttle and the film container in operative relationship with an image recording apparatus such that the image recording apparatus actuates the blocking means whereby the blocking means moves automatically from the first light blocking condition to the unblocking condition for allowing exposure of the film unit through the exposure aperture of the shuttle and the exposing opening;

preventing exposure of the film unit automatically by actuating the blocking means to move from the unblocking condition to the second light blocking condition before the shuttle is out of operative relationship with the image recording apparatus;

transferring the shuttle from the image recording apparatus to an operative relationship with a processor which processes the film unit;

ejecting the film unit from the film container and the shuttle in the processor by automatically moving the blocking means from the second light blocking condition to at least a partially unblocked condition for allowing withdrawal of the exposed film unit from the film container and the shuttle; and, returning automatically the blocking means from said partially open condition to said first blocking condition by a mechanism of the processor while in the processor; whereby the shuttle can be removed from the processor and film in the container is blocked from light and is ready for another exposure by transferring the shuttle back to the image recording apparatus.

30. A method for use in shuttling at least a photosensitive film unit housed in a film container between an image recording apparatus whereat a film unit can be exposed, and a film processing apparatus wherein the film can be removed for processing and wherein the container has an exposure opening, said film shuttling method comprising the steps of:

providing a portable housing assembly which removably receives the film container therein, wherein the housing assembly includes an exposure aperture registerable with the container exposing opening when the container is received within the housing assembly for allowing exposure of a film unit presented at the exposing opening; the housing assembly being constructed to cooperate with an image recording apparatus in an exposing mode of operation, and with a film processing apparatus in a processing mode of operation;

providing the housing assembly with a movable blocking means which is movable between at least a first light blocking condition, a light unblocking condition; and a second light blocking condition; and, automatically controlling movement of the movable blocking means, in response to actuation by the image recording apparatus, between at least the first light blocking condition and the unblocking condition relative to the exposure aperture when the aperture is in registration with the exposing opening for allowing exposure of a film unit when the blocking means is in the unblocking condition; and, controlling movement of the blocking means, in response to a second actuation by the image recording apparatus, from the unblocking condition to the second blocking condition to terminate exposure.

31. The method of claim 30 further including the steps of returning the blocking means back to the first unblocking condition from the second unblocking condition when the housing assembly is in operative relationship with the processor.

32. The method of claim 31 further including the steps of moving the blocking means to at least a partially open condition relative to the exposing opening for allowing a film unit to be picked from an exit slot in the container while in the processor.

33. The method of claim 32 further including the steps of determining the position of the blocking means for indicating the operational conditions of the blocking means.

34. The method of claim 33 wherein said controlling step is by indexing movement of the blocking means from said first blocking condition to said unblocking condition, and to said second blocking condition and controls movement of the blocking means from said second blocking condition to said first blocking condition.

35. The method of claim 34 further including the step of providing the blocking means with indicia on predetermined positions thereof, whereby the indicia is alignable with and will be visible through the shuttle opening when the blocking means is in said first and second blocking conditions to thereby visually indicate the operative conditions of the blocking means to an operator.

36. The method of claim 30 further including the step of counting exposures of the film units which have been exposed in response to movement of the blocking means.

37. The method of claim 30 further wherein said step of providing a housing assembly includes the step of providing such housing assembly with a pair of pivotally connected cover members which move from a lighttight closed condition to an open film container receiving condition; and further including the step of preventing the improper insertion of a film container into the housing assembly when the latter is in said open condition.

38. The method of claim 30 further including the step of preventing movement of the blocking means in one direction beyond a position at which the blocking means is in said second blocking condition.

39. A system for use in shuttling at least a photographic film unit housed in a film container that is carried by a shuttle housing assembly, between an image recording apparatus, whereat a film unit can be exposed, and a film processing apparatus wherein the film can be removed from the film container and said shuttle housing assembly for processing, said system comprising:

a portable shuttle housing assembly which removably receives the film container therein, wherein said housing assembly includes an exposure aperture registerable with a container exposing opening when the container is received within said housing assembly for allowing exposure of a film unit presented at the exposing opening; said housing assembly including light blocking means operable between a light blocking condition, and a light unblocking condition for exposing and preventing exposure of the film unit;

an image recording apparatus which is operable with said shuttle housing;

said image recording apparatus including means for actuating said blocking means when said shuttle housing is in operative relationship with said image recording apparatus, such that said image recording apparatus actuates said blocking means whereby said blocking means moves automatically from said light blocking condition to said unblocking condition for allowing exposure of the film unit through said exposure aperture of the shuttle and the exposing opening of the container, and actuating said blocking means to move from said unblocking condition to said light blocking condition to terminate an exposure before said shuttle housing is out of operative relationship with said image recording apparatus;

a film processor which is operable with said shuttle housing for processing the film unit; said processor including means for ejecting the film unit from the film container and said shuttle in said processor by automatically moving said blocking means from said light blocking condition to at least a partially unblocked condition for allowing withdrawal of the exposed film unit from the film container and shuttle housing; and, means in said processor being operable for returning automatically said blocking means from said partially open condition to said blocking condition, whereby said shuttle housing can be removed from said processor and film in the container is blocked from light and ready for another exposure.

40. The system of claim 39 further including means for determining the position of said blocking means for indicating the operational conditions of said blocking means.

41. The system of claim 40 further including indicia means on said blocking means, whereby indicia is alignable with and will be visible through said shuttle opening when said blocking means is in said blocking conditions to thereby visually indicate operative conditions of said blocking means to an operator.

42. The system of claim 41 further including means for counting exposures of the film units which have been exposed in response to movement of said blocking means.

43. The system of claim 41 further wherein said shuttle housing includes a pair of pivotally connected cover members which move from a lighttight closed condition to an open film container receiving condition; and further including means for preventing the improper insertion of a film container into said housing assembly when the latter is in said open condition.

44. The system of claim 39 further including means for preventing movement of said blocking means in one direction beyond a position at which said blocking means is in said blocking condition.

45. The system of claim 39 wherein said processor includes means operable for selectively preventing said shuttle housing from being removed until at least said blocking means is in said blocking condition.

\* \* \* \* \*